(12) United States Patent
Urashima et al.

(10) Patent No.: US 6,451,941 B1
(45) Date of Patent: *Sep. 17, 2002

(54) INORGANIC DISPERSION STABILIZER AND PROCESS FOR PRODUCING RESINOUS PARTICLES USING THE SAME

(75) Inventors: Nobuaki Urashima; Hayato Ikeda, both of Nara (JP)

(73) Assignee: Nippon Shokubai Co., Ltd., Osaka-fu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,299

(22) Filed: Dec. 23, 1997

(30) Foreign Application Priority Data

Dec. 26, 1996 (JP) .............................. 8-348512
Nov. 19, 1997 (JP) .............................. 9-318416

(51) Int. Cl.⁷ .................................. C08F 4/06
(52) U.S. Cl. ........................ 526/212; 526/221
(58) Field of Search .................. 524/500; 526/212, 526/221

(56) References Cited

U.S. PATENT DOCUMENTS

| | | | | |
|---|---|---|---|---|
| 4,097,437 A | * | 6/1978 | Dhake | 260/29.2 |
| 4,144,074 A | * | 3/1979 | Itoh | 106/1.17 |
| 4,421,660 A | * | 12/1983 | Hajna | 252/62.54 |
| 4,435,219 A | * | 3/1984 | Greigger | 106/287.16 |
| 4,634,733 A | * | 1/1987 | Bauman | 524/859 |
| 4,655,961 A | * | 4/1987 | Wuhrmann | 252/321 |
| 4,680,232 A | * | 7/1987 | Factor | 428/412 |
| 4,912,184 A | | 3/1990 | Akasaki et al. | 526/202 |
| 4,954,562 A | * | 9/1990 | Anderson | 524/779 |
| 5,280,054 A | * | 1/1994 | Sakai | 523/521 |
| 5,292,591 A | * | 3/1994 | Teyssie | 428/522 |
| 5,360,707 A | * | 11/1994 | Kato | 430/538 |
| 5,516,457 A | * | 5/1996 | Dahms | 252/302 |
| 5,830,512 A | * | 11/1998 | Vrba | 424/724 |

FOREIGN PATENT DOCUMENTS

| | | | |
|---|---|---|---|
| EP | 0 236 945 A2 | 9/1987 | |
| EP | 0 848 386 A1 | 6/1998 | ............ H01B/5/14 |
| JP | 50015278 B | 6/1975 | |
| JP | 59-154739 A | 1/1981 | |
| JP | 59-57254 A | 4/1984 | |
| JP | 59-152449 | 8/1984 | |
| JP | 59-152450 A | 8/1984 | |
| JP | 59-152451 A | 8/1984 | |
| JP | 62-151862 A | 7/1987 | |
| JP | 63073225 | 4/1988 | |
| JP | 05301909 | 11/1993 | |
| JP | 6172659 | 6/1994 | |
| JP | 06332257 | 12/1994 | |
| JP | 07002913 | 1/1995 | |
| JP | 09025309 | 1/1997 | |

* cited by examiner

*Primary Examiner*—Paul R. Michl
(74) *Attorney, Agent, or Firm*—Fish & Richardson P.C.

(57) ABSTRACT

An inorganic dispersion stabilizer having a hydrophobic inorganic oxide such as hydrophobic silica dispersed in an aqueous medium in the presence of an hydrophilic organic compound such as alcohol. An suspension polymerization process for producing resinous particles of a narrow particle diameter distribution by dispersing a monomer into an dispersion medium in the presence of the inorganic dispersion stabilizer, and polymerizing the monomer.

13 Claims, 1 Drawing Sheet

FIGURE
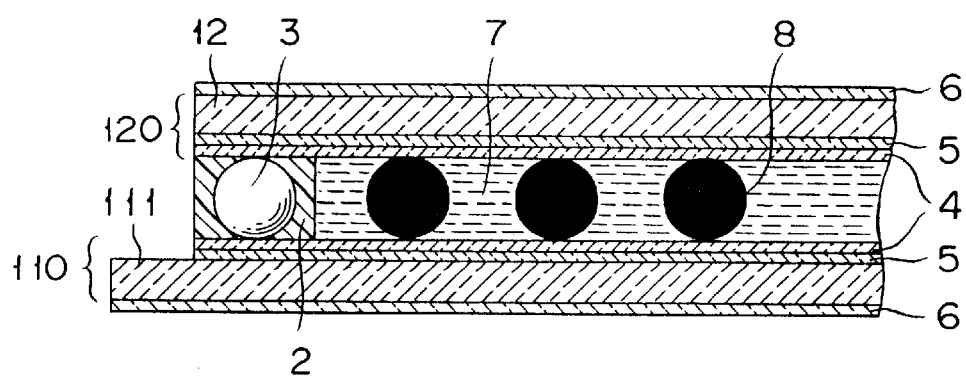

INORGANIC DISPERSION STABILIZER AND PROCESS FOR PRODUCING RESINOUS PARTICLES USING THE SAME

BACKGROUND OF THE INVENTION

1. Technical Field

This invention relates to a polymerization grade inorganic dispersion stabilizer and a process for producing resinous particles using the stabilizer. More particularly, the present invention relates to a polymerization grade inorganic dispersion stabilizer capable of improving the stability of suspension polymerization during the course of the polymerization and a process for producing by using the stabilizer such resinous particles as have a narrow particle diameter distribution and, when extracted as dry particles, excel in flowability, show no sign of adhesion or coalition, exhibit a good environmental property and, when required to disperse in a liquid, manifest a veritably excellent redispersibility. This invention further relates to a process for producing resinous particles useful as a negatively or positively charged toner for the development of a static charge image. This invention also relates to a process for producing resinous particles useful as a spacer for a liquid crystal display panels and a liquid crystal display panel. This invention further relates to a process for producing resinous particles useful as a spacer for a touch panel. This invention also relates to a process for producing resinous particles useful as conductive particles.

2. Prior Art

The electrophotographic method comprises forming an electric latent image on a sensitive element formed of such an inorganic electrophotographic material as selenium, zinc oxide, or cadmium sulfide or an organic electroconductive material, developing this latent image with a powdery developer, and transferring the developed image to the surface of paper, for example.

Heretofore, the toner for use in the electrophotographic development has been produced generally by solving and stirring and consequently dispersing a coloring agent and other additives (such as charge regulating agent, offset preventing agent, and slip additive) in a thermoplastic resin, solidifying the resultant dispersion, finely pulverizing the solid mixture, classifying the powder, and separating colored minute particles of a preferred particle diameter.

The method which produces the toner by pulverization as mentioned above, however, has various defects. Firstly, it necessitates numerous steps including a step of producing the resin, a step of mixing the resin with the coloring agent and other additives, a step of pulverizing the resultant solid mixture, and a step of classifying the powder and obtaining minute colored particles of a preferred particle diameter and numerous kinds of devices required therefor. As a natural consequence, the toner produced by this method is expensive. Particularly, the step of classifying the powder to obtain a toner having a particle diameter in the optimum range is an indispensable requirement for the formation of an image which abounds in clarity and suffers the phenomenon of fogging only sparingly. It is, however, problematic in terms of productivity and yield. Secondly, the step of mixing encounters extreme difficulty in uniformly dispersing the coloring agent and other additives in the resin. Hence, the toner produced by this method has the property of triboelectrification varied from one particle to another by the inferior dispersion of the coloring agent, the charge regulating agent, etc. This imperfect stability of the property results in degradation of the resolution. These problems will grow increasingly conspicuous in the future owing to the trend of the toner toward a gradual decrease in particle diameter which constitutes an essential requirement for the improvement of the quality of image. The existing pulverizers have their limits in obtaining a toner of a minute particle diameter. Even when they manage to obtain a toner of a minute particle diameter, they nevertheless entail an increase in the inconsistency of the amount of electrification on account of the inferior dispersion of the coloring agent and the charge regulating agent.

For the purpose of eliminating the various defects which are observed in the toner produced by the method of pulverization, methods for producing the toner by the technique of suspension polymerization have been proposed.

These methods are aimed at synthesizing a toner containing a coloring substance with great dispatch by mixing a polymerizable monomer with a coloring substance such as carbon black and other additives and suspension polymerizing the resultant mixture. These methods are capable of eliminating the defects attendant on the conventional method resorting to pulverization. Since these methods embrace absolutely no step of pulverization and therefore obviate the necessity for improving the embrittleness of the produced toner, the toners they produce are formed of spherical particles and excel in flowability and enjoy uniformity of the triboelectrification.

The liquid crystal display panel comprises two electrode substrates, a spacer for uniformly retaining a cell gap between the substrates, and a liquid crystal (LC). When the display panel of this construction is exposed to a back light, the beams of the back light penetrate through the panel in the portions seating the particles of the spacer and consequently lacking the presence of liquid crystal. This leakage of the back light has the problem of degrading the contrast of image and impairing the quality of display. Particularly the STN-LCE dictates perfect repression of the leakage of the back light through the portions seating the spacer particles because it effects the display in a normally black mode.

As a means to curb the leakage of light through the sites of the spacer particles, the method which comprises coloring the spacer particles has been tried. Among the conventional coloring methods are included those methods which use such coloring agents as dyes and pigments.

The methods for attaining coloration with a dye include a method which comprises suspension polymerizing a monomer and a dye (JP-A-05-301,909 refers), for example. The methods for effecting coloration with a pigment include methods which comprise suspension polymerizing a monomer and a pigment (JP-A-07-2,913 and JP-A-09-25,309), for example.

The transparent touch panel which detects a position pressed with a nib of a pen, for example, and emits the detected position in the form of a signal indicating relevant two-dimensional coordinates is combined with the display screen of a liquid crystal display, EL display, plasma display, CRT (Braun tube), etc. and utilized as a device of easy input in numerous fields.

This transparent touch panel has transparent thin-film electrodes formed one each on the surfaces of the transparent substrates thereof and has these electrodes disposed inside as opposed to each other across an intervening space. For the purpose of separating the electrodes as described above, it has been customary to adopt a method which comprises disposing spherical beads as an insulating spacer between the electrodes which are formed on the substrates.

As a means to produce the resinous particles which are used as the insulating space mentioned above, a method which comprises suspension polymerizing a polymerizable monomer may be cited.

The conventional conductive particles comprise polymer particles and a conductive layer formed on the surface of each of the particles. Generally, the conductive particles are used in the electronics packaging field for the purpose of connecting a pair of electrodes. Specifically, a pair of electrodes having the conductive particles interposed therebetween are pressed against each to establish electric connection between the two electrodes through the medium of the conductive particles.

As a means to produce polymer particles destined to form the basis for the conductive particles mentioned above, a method which resides in suspension polymerizing a polymerizable monomer may be cited.

In the production of resinous particles by such methods of suspension polymerization as are utilized in various applications mentioned above, it is difficult from the technical point of view to effect the polymerization in a system having liquid drops of a monomer composition stably suspended therein without entailing coalition and to obtain by the polymerization minute resinous particles having a uniform particle diameter distribution.

In the suspension polymerization of a polymerizable monomer composition in an aqueous medium, therefore, it has been customary to use a dispersion stabilizer which is capable of preventing polymer particles gradually formed in consequence of the advance of polymerization from succumbing to coalition.

As dispersion stabilizers, such sparingly soluble finely pulverized inorganic compounds as, for example, sparingly soluble salts like $BaSO_4$, $CaSO_4$, $MgCO_3$, $BaCO_3$, $CaCO_3$, and $Ca(PO_4)_2$, such inorganic polymers as diatomaceous earth, talc, silicic acid, and clay, powdered metal oxides, or such water-soluble polymers as polyvinyl alcohol, gelatin, and starch have been in popular use.

When a sparingly water-soluble inorganic substance is used, however, in spite of the possibility of this substance acquiring a relatively narrow particle diameter distribution, the amount of this substance to be effectively used is relatively large when it is required to have such a preferred particle diameter as falls in the approximate range of 2–30 $\mu$m. Further, owing to the behavior of a surfactant (emulsifier) to be used as an auxiliary dispersion stabilizer, this substance has such a problem relating to the control of particle diameter distribution as the generation of a fine powder owing to the emulsion polymerization which is inevitably entrained. It also calls for an operation of removing the dispersion stabilizer by the washing treatments with an acid and water subsequently to the step of polymerization. If this removal is not thorough, the residue induces the problem of impairing electric properties.

When a water-soluble polymer is used, the particles which are obtained by the suspension polymerization inevitably have an unduly wide particle diameter distribution because they copiously contain particles of minute diameters. In order for the resinous particles to acquire a narrow particle diameter distribution, they require a procedure of performing such complicated works as classification up to several repetitions. Besides, since the dispersion stabilizer deposited on the surface of particles is not easily removed, the particles are at a disadvantage in seriously impairing electric properties and succumbing to such adverse phenomena as cohesion and coalition.

SUMMARY OF THE INVENTION

This invention, therefore, has an object of providing a novel inorganic dispersion stabilizer and a process for producing resinous particles using the stabilizer.

This invention has another object of providing a polymerization grade inorganic dispersion stabilizer capable of improving the stability of suspension polymerization during the course of the polymerization and a process for producing by using the stabilizer such resinous particles as have a narrow particle diameter distribution and, when extracted as dry particles, excel in flowability, show no sign of adhesion or coalition, exhibit an excellent environmental property and, when required to disperse in a liquid, manifest a veritably excellent redispersibility.

Further, this invention has an object of providing a process for producing resinous particles which have a narrow particle diameter distribution and consequently permit simplification of the step of classification, enjoy a high yield, and excel in productivity and, when expected to serve as a toner for the development of a static charge image, produce resinous particles useful as a negatively or positively charged toner for static charge image manifesting such outstanding image properties as stabilizing an image, exhibiting good repeatability of fine lines in the image, and precluding the phenomenon of fogging owing to an extremely narrow particle diameter distribution and excellent electric properties.

This invention has another object of providing a process for producing resinous particles which have a narrow particle diameter distribution and consequently permit simplification of the step of classification, enjoy a high yield, and excel in productivity and, when incorporated in a liquid crystal display panel, produce resinous particles useful as a spacer for the liquid crystal display panel manifesting such outstanding properties as precluding the occurrence of an uneven gap, having such strength and hardness as allow easy gap control, suffering only sparing leakage of light through portions encircling the spacer particles, and warranting high reliability and a liquid crystal display panel.

This invention has still another object of providing a process for producing resinous particles which have a narrow particle diameter distribution and permit simplification of the step of classification as a consequence, enjoy a high yield, and excel in productivity and, when incorporated in a touch panel, produce resinous particles useful as a spacer for the touch panel manifesting such outstanding properties as suffering no degradation of the accuracy of detection of the potential of the input, improving the resolution of fine lines of the input, enjoying the linearity of lines of the input, and moreover enabling the electrodes to offer a highly satisfactory insulation and preventing the upper and lower substrates from defective contact or short circuit and a touch panel.

This invention has another object of providing a process for producing resinous particles which have a narrow particle diameter distribution and permit simplification of the step of classification as a consequence, enjoy a high yield, and excel in productivity and, when incorporated in a pair of electrodes destined to be electrically connected, produce resinous particles useful as conductive particles permitting easy retention of a fixed distance between the electrodes and suffering only sparing defective connection.

The objects mentioned above are accomplished by a polymerization grade inorganic dispersion stabilizer, characterized by a process which comprises dispersing a hydrophobic inorganic oxide in an aqueous medium in the presence of a hydrophilic organic compound.

This invention also concerns an inorganic dispersion stabilizer, wherein the hydrophobic inorganic compound is hydrophobic silica and the hydrophilic organic compound is an alcohol.

The objects mentioned above are further accomplished by a process for producing a resinous particles, characterized by dispersing a monomer composition containing a polymerizable monomer in the presence of a polymerization grade inorganic dispersion stabilizer obtained by dispersing the hydrophobic inorganic oxide in an aqueous medium in the presence of the hydrophilic organic compound and polymerizing the resultant dispersion.

This invention also concerns a process for producing the resinous particles, wherein the monomer composition comprises a polymerizable monomer and a coloring agent.

This invention also concerns resinous particles obtained by the process mentioned above.

This invention further concerns a resinous composition which contains the resinous particles mentioned above.

This invention further concerns a toner for the development of a static charge image which contains the resinous particles mentioned above.

This invention further concerns a spacer for use in a liquid crystal display panel which contains the resinous particles mentioned above.

This invention further concerns a liquid crystal display panel which is obtained by using the spacer for use in a liquid crystal display panel mentioned above.

This invention further concerns a spacer for use in a touch panel which contains the resinous particles mentioned above.

This invention also concerns a touch panel which is obtained by using the spacer for use in a touch panel mentioned above.

This invention further concerns conductive particles which comprise the resinous particles mentioned above and a conductive layer formed on the surface of each of the resinous particles.

The present inventors have pursued a diligent study in search of a dispersion stabilizer capable of improving the stability of liquid drops of a polymerizable monomer composition during the aqueous suspension polymerization of the polymerizable monomer thereby producing resinous particles of a narrow particle diameter distribution. They have been consequently ascertained that when a hydrophobic inorganic oxide such as, for example, minute particles of hydrophobic silica is uniformly dispersed in an aqueous medium in the presence of a hydrophilic organic compound such as, for example, an alcohol and dispersing until a prescribed particle diameter, suspending, and suspension polymerizing a polymerizable monomer composition in the resultant aqueous dispersion (now serving as a dispersion stabilizer), the liquid drops during the course of polymerization induce virtually no coalition and resinous particles of an extremely narrow particle distribution are obtained. They have been further ascertained that the resinous particles have a narrow particle diameter distribution and, when extracted as dry particles, excel in flowability, show no sign of adhesion or coalition, and exhibit an excellent environmental property, that the resinous particles, when required to disperse in a liquid, manifest a veritably excellent redispersibility, permit simplification of the step of classification, enjoy a high yield, and excel in productivity, that the resinous particles thus obtained have the electric properties thereof affected only sparingly by the environmental conditions because they have solidified on the surface thereof the hydrophobic inorganic oxide which has been used as one component of the dispersion stability, and that the resinous particles, when expected to serve as a toner for the development of a static charge image, prove to be useful as the material for the toner for static charge image which manifests such outstanding image properties as stabilizing an image, exhibiting good repeatability of fine lines in the image, and precluding the phenomenon of fogging owing to an extremely narrow particle diameter distribution and excellent electric properties because they can be endowed with either positive charge or negative charge by properly selecting the species of a hydrophobic inorganic oxide to be used.

They have been further ascertained that the resinous particles have a narrow particle diameter distribution and consequently permit simplification of the step of classification, enjoy a high yield, and excel in productivity and, when incorporated in a liquid crystal display panel, prove to be useful as a spacer for the liquid crystal display panel manifesting such outstanding properties as precluding the occurrence of an uneven gap, exhibiting such strength and hardness as allow easy gap control, suffering only sparing leakage of light through portions encircling the spacer particles, and warranting high reliability and a liquid crystal display panel and that the produced liquid crystal display panel can be used highly advantageously. This invention has been perfected as a result.

They have been also ascertained that the resinous particles have a narrow particle diameter distribution and permit simplification of the step of classification as a consequence, enjoy a high yield, and excel in productivity and, when incorporated in a touch panel, prove to be useful as a spacer for the touch panel manifesting such outstanding properties as suffering no degradation of the accuracy of detection of the potential of the input, improving the resolution of fine lines of the input, enjoying the linearity of lines of the input, and moreover enabling the electrodes to offer a highly satisfactory insulation and preventing the upper and lower substrates from defective contact or short circuit and a touch panel. This invention has been perfected as a result.

Further, they have been ascertained that the resinous particles have a narrow particle diameter distribution and permit simplification of the step of classification as a consequence, enjoy a high yield, and excel in productivity and, when incorporated in a pair of electrodes destined to be electrically connected, prove to be advantageously useful as conductive particles permitting easy retention of a fixed distance between the electrodes and suffering only sparing defective connection. This invention has been perfected as a result.

BRIEF DESCRIPTION OF THE DRAWING

FIGURE is a sectional view to aid in the description of a liquid crystal display panel as one example of this invention.

DESCRIPTION OF PREFERRED
EMBODIMENTS OF THE INVENTION

Now, this invention will be described specifically below with reference to preferred embodiments.

The polymerization grade inorganic dispersion stabilizer according to this invention is characterized by a process which comprises dispersing a hydrophobic inorganic oxide in an aqueous medium in the presence of a hydrophilic organic compound.

As concrete examples of the hydrophobic inorganic oxide, hydrophobic silica, hydrophobic alumina, hydrophobic titania, hydrophobic zirconia, hydrophobic magnesia, hydrophobic zinc oxide, hydrophobic chromium oxide, and various hydrophobic inorganic oxide pigments may be cited. Among other hydrophobic inorganic oxides mentioned above, hydrophobic silica proves to be particularly preferable. These hydrophobic inorganic oxides may be used either singly or in the form of a mixture of two or more members.

When the resinous particles produced by using the dispersion stabilizer according to this invention are to be used as the material for a toner for the development of a static charge image, hydrophobic negatively charging silica or hydrophobic positively charging silica can be advantageously used, depending on the charging property to be required.

The expression "degree of hydrophobicity of the hydrophobic inorganic oxide" as used in this specification has no particular restriction. Those hydrophobic inorganic oxides which have hydrophobicity indexes (Mw: methanol wettability) exceeding 5 are advantageous because they can impart excellent environmental resistance to the produced resinous particles. Further, these hydrophobic inorganic oxides are advantageous in terms of charge stability when the resinous particles are applied to the toner for use in static charge development.

The term "hydrophobicity index" as used in this invention refers to the numerical value which is obtained by the following procedure.

1) Place a 0.2-g sample in a 200-ml beaker and add 50 ml of purified water thereto.

2) Keep them electromagnetically stirred and add methanol meanwhile to below the liquid level in the beaker.

3) Find as the end point the stage at which the sample ceases to be observed on the liquid level.

4) Calculate the degree of hydrophobicity in accordance with the following formula using the amount of methanol spent for the titration.

Hydrophobicity index $(\%) = \{x/(50+x)\} \times 100$ (wherein x represents the amount of methanol used (ml))

The hydrophobic inorganic oxide to be used in the polymerization degree inorganic dispersion stabilizer of this invention has a particle diameter preferably in the approximate range of 0.001–1 $\mu$m, more preferably 0.005–0.5 $\mu$m. The reason for this range is that if the particle diameter of the hydrophobic inorganic oxide is smaller than 0.001 $\mu$m or larger than 1 $\mu$m, the possibility that the effect in improving the dispersion stability of the drops of the polymerizable monomer composition in the aqueous medium is unduly small will be large.

Since the hydrophobic inorganic oxide of this quality in its unmodified state is not easily dispersed uniformly in the aqueous medium, this invention contemplates dispersing the hydrophobic inorganic oxide in the aqueous medium in the presence of a hydrophilic organic compound thereby forming a uniform dispersion and allowing the hydrophobic inorganic oxide to function as a dispersion stabilizer effectively in suspension polymerization.

The hydrophilic organic compound imposes no restriction particularly but requires only to be capable of uniformly dispersing the hydrophobic inorganic oxide in the aqueous medium. Though it is known in numerous species, it preferably is capable of being easily removed from the resin particles to be obtained in consequence of suspension polymerization. As concrete examples of the hydrophilic organic compound which is effectively used herein, alcohols such as methyl alcohol, ethyl alcohol, and isopropyl alcohol, ether acetals such as tetrahydrofuran, keton aldehydes such as acetone and diacetone alcohol, esters such as methyl lactate, polyhydric alcohol derivatives such as glycerin and ethylene glycol, carboxylic acids such as propionic acid, anhydrides, nitrogen-containing compounds such as N,N-dimethyl formamide, sulfur-containing compounds such as dimethyl sulfoxide, and fluorine-containing compounds such as 2,2,3,3-tetrafluoropropanol may be preferably cited. Among other hydrophilic organic compounds mentioned above, alcohols, particularly methyl alcohol, ethyl alcohol, and isopropyl alcohol prove to be particularly favorable in respect that they excel in ability to disperse hydrophobic inorganic oxides in an aqueous medium, that they allow easy control of liquid drops (particles of a polymerizable monomer composition) of an arbitrary particle diameter during the suspension of a polymerizable monomer in the aqueous medium having a hydrophobic inorganic oxide uniformly dispersed therein, that they enable suspension polymerization to proceed stably without notably affecting the polymerizable monomer composition during the course of the polymerization, and that they affect only sparingly the physical properties of the resinous particles obtained in consequence of the suspension polymerization and permit easy removal from the resinous particles.

The amounts of the hydrophobic inorganic oxide and the hydrophilic organic compound to be incorporated in the polymerization grade inorganic dispersion stabilizer of this invention impose no particular restriction. Properly in the stabilizer assuming a form ready for use in the final suspension polymerization system, the amount of the hydrophobic inorganic oxide is in the approximate range of 0.1–20 parts by weight, preferably 0.5–10 parts by weight, based on 100 parts by weight of the polymerizable monomer composition and the amount of the hydrophilic organic compound is in the approximate range of 1–3000 parts by weight, preferably 10–1000 parts by weight, based on 100 parts by weight of the hydrophobic inorganic oxide. If the amount of the hydrophobic inorganic oxide is less than 0.1 part by weight, based on 100 parts by weight of the polymerizable monomer composition, the stability of dispersion of the liquid drops of a polymerizable monomer composition during the course of polymerization will be possibly insufficient. Conversely, if the amount exceeds 20 parts by weight, the excess will neither realize a normally expected proportionate addition to the effect thereof nor do any good economically and the hydrophobic inorganic oxide suffered to adhere fast to the produced resinous particles will grow in amount and the characteristics of the resinous particles will possibly be degraded. If the amount of the hydrophilic organic compound to be incorporated is less than 1 part by weight, based on 100 parts by weight of the hydrophobic inorganic oxide, the hydrophobic inorganic oxide will not be uniformly dispersed in the suspension polymerization system and the stability of dispersion of the liquid drops of the polymerizable monomer composition will be possibly insufficient during the course of polymerization. Conversely, if this amount exceeds 3000 parts by weight, the excess will neither realize a normally expected proportionate addition to the uniformity of dispersion of the hydrophobic inorganic oxide nor do any good economically and the liquid drops of a polymerizable monomer composition will be formed insufficiently and the stability of polymerization will be possibly insufficient.

In the process for producing resinous particles according to this invention, after a homogeneous dispersion has been produced by the dispersion of a hydrophobic inorganic oxide in an aqueous medium in the presence of a hydrophilic organic compound, it is necessary for a polymerizable monomer composition to be suspended in the homogeneous dispersion or, as occasion demands, in what is obtained by further adding an aqueous medium to the homogeneous dispersion.

The emulsifying and dispersing device for dispersing the hydrophobic inorganic oxide in the aqueous medium in the presence of the hydrophilic organic compound and consequently forming the homogeneous dispersion imposes no particular restriction. The dispersion is preferred to be effected homogeneously by using a high-speed shearing turbine type dispersing device such as T.K. Homomixer (produced by Tokushu Kika Kogyo K.K.), a piston type high pressure homogenizing device (produced by Gorin K.K.), a high-pressure jet homogenizer such as Microfluidizer (produced by Microfluidix K.K.), an ultrasonic emulsifying and dispersing device such as Ultrasonic Homogenizer (produced by Nippon Seiki Seisakusho K.K.), a medium stirring type dispersing device such as Attriter (produced by Mitsui Kozan K.K.), or a forced gap passing dispersing device such as Colloid Mill (produced by Nippon Seiki Seisakusho K.K.), for example.

The polymerizable monomer to be used in the process for producing resinous particles according to this invention imposes no restriction particularly but requires only to be capable of being suspension polymerized. As concrete examples of the polymerizable monomer which is effective used herein, styrene type monomers such as styrene, o-methyl styrene, m-methyl styrene, p-methyl styrene, α-methyl styrene, p-methoxy styrene, p-tert-butyl styrene, p-phenyl styrene, o-chlorostyrene, m-chlorostyrene, p-chlorostyrene, acrylic or methacrylic type monomers such as methyl acrylate, ethyl acrylate, n-butyl acrylate, isobutyl acrylate, dodecyl acrylate, stearyl acrylate, 2-ethylhexyl acrylate, methyl methacrylate, ethyl methacrylate, propyl methacrylate, n-butyl methacrylate, isobutyl methacrylate, n-octyl methacrylate, dodecyl methacrylate, 2-ethylhexyl methacrylate, and stearyl methacrylate, and other vinyl type monomers such as ethylene, propylene, butylene, vinyl chloride, vinyl acetate, and acrylonitrile may be cited. These polymerizable monomers may be used either singly or in the form of a mixture of two or more members. It is particularly preferably to use a styrene type monomer, an acrylic acid or methacrylic acid type monomer, or a combination thereof among other polymerizable monomers mentioned above.

Where the resinous particles to be produced are required to have a cross-linked structure between the adjacent molecules thereof, it is allowable to use (meth)acryl type monomers such as trimethylol propane trimethacrylate, ethylene glycol dimethacrylate, diethylene glycol dimethacrylate, triethylene glycol dimethacrylate, decaethylene glycol dimethacrylate, pentadecaethylene glycol dimethacrylate, pentacontahectaethylene glycol dimethacrylate, 1,3-butylene dimethacrylate, allyl methacrylate, trimethylol propane trimethacrylate, pentaerythritol tetramethacrylate, and diethylene glycol dimethacryl phthalate which contain in the molecular units thereof a plurality of polymerizing double bonds, such aromatic divinyl compounds as divinyl benzene, divinyl naphthalene, and derivatives thereof, such cross-linking agents as N, N-divinyl aniline, divinyl ether, divinyl sulfide, and divinyl sulfonic acid, polybutadiene, polyisoprene, unsaturated polyesters, and such reactive polymers as are disclosed in JP-B-57-56,507, JP-A-59-221, 304, JP-A-59-221,305, JP-A-59-221,306, and JP-A-59-221, 307. Such disclosures of JP-B-57-56,507, JP-A-59-221,304, JP-A-59-221,305, JP-A-59-221,306, and JP-A-59-221,307 as relate hereto are incorporated in the present specification.

The particle diameter distribution may be uniformized by causing the polymerizable monomer composition to incorporate therein a (co)polymer similar in composition to the polymerizable monomer or other (co)polymer such as, for example, styrene type resin, styrene-acrylate type resin, rosin derivative, aromatic type petroleum resin, pinene type resin, epoxy type resin, or coumarone type resin. The polymer imposes no particular restriction but prefers to have a weight average molecular weight in the approximate range of 500–100000, especially 1000–50000. The amount of the (co)polymer to be incorporated is properly in the approximate range of 0–50 parts by weight, based on 100 parts by weight of the polymerizable monomer.

Further, the polymerizable monomer composition, as occasion demands, may incorporate therein coloring agents such as pigment and dye and other additives such as, for example magnetic powder, offset preventing agent, charge controlling agent, plasticizer, polymerization stabilizer, antistatic agent, and flame retardant.

As concrete examples of the pigment, such inorganic pigments as white lead, minimum, chrome yellow, carbon black, ultramarine blue, zinc oxide, cobalt oxide, titanium dioxide, iron oxide, silica, titanium yellow, and titanium black and such organic pigments as yellow pigments like Naples Yellow, Naphthol Yellow S, Hansa Yellow 10G, Benzidine Yellow G, Benzidine Yellow GR, Quinoline Yellow Lake, Permanent Yellow NCG, and Tartrazine lake, orange pigments like Molybdene Orange, Permanent Orange RK, Benzidine Orange G, and Indanthrene Brilliant Orange GK, red pigments like Permanent Red 4R, Resol Red, Pyrazolone Red 4R, Watching Red Calcium Salt, Lake red D, Brilliant Carmine 6B, Eosine Lake, Rhodamine Lake B, Azarine Lake, and Brilliant Carmine B, purple pigments like Fast Violet B, Methyl Violet Lake, and Dioxane Violet, blue pigments like Alkali Blue Lake, Victoria Blue Lake, Phthalocyanine Blue, Non-metallic Phthalocyanine Blue, Phthalocyanine Blue Partial Chloride, Fast Sky Blue, and Indanth Blue BC, green pigments like Pigment Green B, Malachite Green Lake, and Fanal Yellow Green G, and isoindolinon, quinacridon, Perinon pigment, Perilene pigment, insoluble azo pigments, soluble azo pigments, and dying lakes may be cited.

As concrete examples of the dye, nitroso dye, nitro dye, azo dye, stilbene azo dye, diphenyl methane dye, triphenyl methane dye, xanthene dye, acridine dye, quinoline dye, methine dye, polymethine dye, thiazol dye, indamin dye, indophenol dye, azine dye, oxazine type, thiazine dye, and sulfide dye may be cited.

As concrete examples of the magnetic powder, powders of such ferromagnetic metals as iron, cobalt, and nickel and powders of such metal compounds as magnetite, hematite, and ferrite may be cited. These magnetic powders also function as coloring agents.

Incidentally, these coloring agents and other additives may have been given a surface treatment performed by a varying method for the purpose of attaining improved dispersibility in the polymerizable monomer. As concrete examples of the surface treatment, a method using a long-chain hydrocarbon such as stearic acid or oleic acid for the treatment, a method using a polymerizable monomer such as acrylic acid or methacrylic acid which contains a polar group for the treatment, a method using such a polyhydric alcohol as trimethylol propane for the treatment, a method using such an amine as triethanol amine for the treatment, a method using a varying coupling agent for the treatment, and a method which comprises causing a coloring agent or other additives to react with a polymer having such a reactive group as aziridine group, oxazoline group, N-hydroxyalkyl amide group, epoxy group, thioepoxy group, isocyanate group, vinyl group, silicon type hydrolyzing group, or amino group which is capable of reacting with the functional group on the surface thereof at a temperature in the range of 20–350° C. thereby grafting the resultant polymer to the surface of the coloring agent or other additive may be cited. Particularly when carbon black is used as the coloring agent, it is particularly advantageous to use the carbon black graft polymer which is disclosed in JP-A-63-270,767 and JP-A-63-265,913. Such disclosures of JP-A-63-270,767 and JP-A-63-265,913 as relate hereto are incorporated in the present specification. Concretely, the following two methods are preferable.

(i) A method which gives carbon black a surface treatment using a polymer (P) having a reactive group (X) capable of reacting with the functional group had by the carbon black.

(ii) A method which gives carbon black a surface treatment effected by polymerizing a vinyl type monomer having one double bond group in the presence of the carbon black.

First, the method of (i) will be described.

The reactive group (X) capable of reacting with the functional group had by the carbon black imposes no particular restriction but requires only to be capable of reacting the functional group of the carbon black. As concrete examples of the reactive group, heterocyclic groups such as epoxy group, thioepoxy group, aziridine group, and oxazoline group and amino groups such as isocyanate group and N-hydroxyalkyl amide group may be cited. Among other reactive groups mentioned above, heterocyclic groups prove to be particularly advantageous. In consideration of the reactivity with the functional group had by the carbon black, epoxy group, aziridine group, and oxazoline group prove to be especially advantageous. The number of the reactive groups (X) is appropriate in the approximate range of 50–1, preferably 20–1, though depending on the relation with the number of functional groups had by the carbon black.

The polymer (P) having the reactive group (X) imposes no particular restriction but requires only to contain the reactive group (X) capable of reacting with the functional group had by the carbon black. As concrete examples of the polymer (P), a polysiloxane type structure, poly (meth)acryl type structure, polyether type structure, polyester type structure, polyalkylene type structure, polyamide type structure, polyimide type structure, polyurethane type structure, polystyrene type structure, and copolymers thereof may be cited. These structures may be in a linear or branched configuration.

Among other polymers mentioned above, vinyl type polymers and copolymers forming a block or graft polymer with the vinyl polymers prove to be particularly advantageous in respect that they are capable of exalting the dispersibility in the vinyl type monomer (B) having two or more double bond groups. The vinyl type polymers impose no particular restriction. Preferably, vinyl type monomers alone which have a reactive group (X) capable of reacting with the functional group had by the carbon black or vinyl type polymers (such as poly(meth)acryl type and polystyrene type) which are obtained by (co)polymerizing the monomers mentioned above with other vinyl type monomer copolymerizable therewith (such as, for example, (meth)acrylic acids, (meth)acrylic esters, (meth)acrylamides, and styrenes) may be cited.

The possession by the polymer (P) of the reactive group (Y) capable of reacting with the vinyl type monomer (B) containing two or more double bond groups proves to be advantageous because the vinyl type monomer (B) reacts with the reactive group (Y) and, in consequence of this reaction, the produced particles enjoy fixation of carbon black therein, acquire strength and hardness enough to facilitate gap control, allay the bleeding of a pigment and impurities originating therein, and produce a colored spacer of high reliability.

The molecular weight of the polymer (P) of the quality mentioned above imposes no particular restriction but requires only to have a number average molecular weight, Mn, in the range of $200-1\times10^6$, preferably $300-1\times10^5$, and more preferably $1000-5\times10^4$.

The reactive group (Y) capable of reacting with the vinyl type monomer (B) containing two or more double bond groups imposes no particular restriction. Advantageously, it is at least one member selected from the group consisting of double bond group, hydroxyl group, amino group, carboxyl group, and alkoxysilyl group. It is particularly preferred to be a double bond group from the viewpoint of the reactivity with the vinyl type monomer (B). The number of reactive groups (Y) is not particularly restricted but is required only to be in the approximate range of 20–1, preferably 10–1, on the average per molecule of the polymer.

The polymer (P) which has the reactive group (X) of the quality just described can be produced from a corresponding monomer by any of the well-known methods such as, for example, bulk polymerization method, suspension polymerization method, emulsion polymerization method, precipitation polymerization method, and solution polymerization method. It may be otherwise obtained by preparatively forming a polymer and subsequently incorporating the reactive group in the produced polymer.

The treatment of the carbon black with the polymer (P) having the reactive group (X) capable of reacting with the functional group had by the carbon black can be carried out by various methods. The reaction of the carbon black with the polymer (P) may be attained, for example, by mixing them by stirring at a temperature in the range of from room temperature to 350° C. According to this method, the carbon black used in a state of secondary aggregation as a raw material, when mixed for the sake of the reaction, is efficiently disintegrated and converted into minute particles of a uniform diameter and the efficiency of this reaction is improved as well.

The reaction mentioned above, when necessary, may be carried out in the presence of a liquid dispersion medium. As the dispersion medium to be used herein, a nonpolar solvent having a boiling point of not higher than 150° C. proves to be advantageous in respect that it is incapable of reacting with the reactive group (X).

The reaction of the carbon black with the polymer (P) in the presence of the liquid dispersion medium of the quality mentioned above is effected by mixing the reactants in the dispersion medium at a temperature in the range of 50–150° C., preferably 70–140° C. for a period in the range of 0.5–10 hours, preferably 1–5 hours.

Though the ratio of the carbon black and the polymer (P) is not particularly restricted, it is properly such that the amount of the polymer (P) is in the range of 1–5000, preferably 1–1000, and more preferably 2–250 parts by weight, based on 100 parts by weight of the carbon black. If the amount of the polymer (P) is less than 1 part by weight, it will possibly incur difficulty in thoroughly improving the attributes, particularly the surface attributes, of the carbon black. Conversely, if this amount exceeds 5000 parts by weight, the proportion of the polymer to be coupled with the carbon black will increase possibly to the extent of not merely harming economy but also impairing the characteristic properties expected of the carbon black.

Next, the method of (ii) will be described.

The vinyl type monomer (A) having one double bond group is not particularly restricted. As concrete examples of the vinyl monomer (A) to be used advantageously herein, (meth) acrylic acids, (meth) acrylic esters, (meth) acrylamides, styrenes, and vinyl esters may be cited. When the vinyl type monomer (A) of this quality is polymerized, the radical at the growth terminal of the polymer is trapped in the benzene ring of the carbon black and consequently the polymer of the vinyl type monomer (A) is grafted to the surface of the carbon black. Even when the vinyl type monomer (A) is destitute of such a reactive group (X) as is mentioned above, the surface of the carbon black is treated by the polymer of the vinyl type monomer (A) by the mechanism mentioned above.

As concrete examples of the method for polymerizing the vinyl type monomer (A) in the presence of the carbon black, such well-known methods as bulk polymerization method and solution polymerization method may be cited. From the viewpoint of enabling the polymer of the vinyl type monomer (A) to be grafted efficiently to the surface of the carbon black, the bulk polymerization method and solution polymerization method prove to be advantageous and the bulk polymerization method proves to be most advantageous. The suspension polymerization method of emulsion polymerization method which uses water impairs the efficiency of grafting because the carbon black is present in water. The polymerization, for example, is carried out by mixing the carbon black and the vinyl type monomer (A) in the absence or presence of a solvent together with a polymerization initiator at a temperature in the range of normal room temperature ($25\pm2°$ C.) to $350°$ C., preferably $50–200°$ C.

According to this method, the carbon black used in a state of secondary aggregation as a raw material, when mixed for the sake of the reaction, is efficiently disintegrated and converted into minute particles of a uniform diameter.

Though the ratio of the carbon black and the vinyl type monomer (A) is not particularly restricted, it is properly such that the weight of the vinyl type monomer (A) is in the range of 1–5000, preferably 10–5000, and more preferably 20–5000 parts by weight, based on 100 parts by weight of the carbon black. If the amount of the vinyl type monomer (A) is less than 1 part by weight, it possibly incur difficulty in thoroughly improving the attributes, particularly the surface attributes, of the carbon black. Conversely, if this amount exceeds 5000 parts by weight, the polymerization will no longer be inhibited from generating heat and, at the same time, the proportion of the polymer to be coupled with the carbon black will increase possibly to the extent of not merely harming economy but also impairing the characteristic properties expected of the carbon black.

The carbon black having the surface thereof treated with the polymer (P) by the method of (i) or (ii) mentioned above may be put in its unmodified form to use. The carbon black, however, is preferred to be deprived of the polymer which has not reacted with the surface of the carbon black.

When a coloring agent other than carbon black is to be used, the surface-treated coloring agent which is obtained by the method disclosed in JP-A-1-118,573 proves to be advantageous. Incidentally, such a disclosure of JP-A-1-118,573 as relates hereto is incorporated in the present specification.

The dispersibility of carbon black in the polymerizable monomer may be improved by causing the polymerizable monomer composition to incorporate a low molecular polymer therein. The low molecular polymer is not particularly restricted. As concrete examples of the low molecular polymer which is usable advantageously herein, styrene type resins, styrene-acrylate type resins, rosin derivatives, aromatic type petroleum resins, pinene type resins, epoxy type resins, and coumarone type resins which have weight average molecular weights in the approximate range of 500–100000, preferably 1000–50000, may be cited. The amount of the low molecular polymer to be incorporated is proper in the approximate range of 0–50 parts by weight, based on 100 parts by weight of the polymerizable monomer, though it is at the mercy of the amount of carbon black, etc. to be incorporated.

When the basis for a toner for use in static image development is to be manufactured in accordance with the process of this invention for producing resinous particles, the relevant reactants are preferred to incorporate therein an offset preventing agent in addition to the coloring agent and/or the magnetic powder mentioned above. Though the offset preventing agent is not particularly restricted, polymers having a softening point of 80–180 ° C. determined by the ball-and-ring method, such as, for example, so-called polyolefin waxes, i.e., polyolefins which have weight average molecular weights in the approximate range of 1000–45000, preferably 2000–6000, are advantageously used. As concrete examples of the polyolefin wax, such homopolymers as polyethylene, polypropylene, and polybutylene, such olefin copolymers as ethylene-propylene copolymer, ethylenebutene copolymer, ethylene-pentene copolymer, ethylene-3-methyl-1-butene copolymer, and ethylene-propylene-butene copolymer, and copolymers of olefins with other monomers such as, for example, vinyl ethers like vinylmethyl ether, vinyl-n-butyl ether, and vinylphenyl ether, vinyl esters like vinyl acetate and vinyl butyrate, haloolefins like vinyl fluoride, vinylidene fluoride, tetrafluoroethylene, vinyl chloride, vinylidene chloride, and tetrachloroethylene, (meth)acrylic esters like methylacrylate, ethyl acrylate, n-butylacrylate, methyl methacrylate, ethyl methacrylate, n-butylmethacrylate, stearyl methacrylate, N,N-dimethylaminoethyl methacrylate, and t-butylaminoethyl methacrylate, acrylic acid derivatives like acrylonitrile and N, N-dimethyl acrylamide, organic acids like acrylic acid, methacrylic acid, maleic acid, fumaric acid and itaconic acid, and diethyl fumarate and β-pinene may be cited.

As the offset preventing agent, natural or synthetic paraffin waxes, particularly high melting paraffin waxes having melting points in the range of 60–70° C., fatty acid metal salts such as zinc salt, barium salt, lead salt, cobalt salt, calcium salt, and magnesium salt of stearic acid, zinc salts, manganese salts, iron salts, and lead salts of olefinic acids, and zinc salt, cobalt salt, and magnesium salt of palmitic acid, particularly higher fatty acid salts of not less than 17 carbon atoms, higher alcohols such as myricyl alcohol, polyhydric alcohol-esters such as glyceride stearate and glyceride palmitate, fatty esters such as myricyl stearate and myricyl palmitate, partially saponified esters of fatty acids such as partially saponified esters of montanic acid, higher fatty acids such as stearic acid, palmitic acid, and montanic acid, and fatty acid amides such as ethylene bisstearoyl amide and mixtures thereof are usable besides the polyolefins enumerated above.

Further, as the offset preventing agent, such crystalline (meth)acrylic ester type polymers as are disclosed in JP-A-6-148,936, JP-A-6-194,874, and JP-A-6-194,877 are usable. Incidentally, such disclosures of JP-A-6-148,936, JP-A-6-194,874, and JP-A-6-194,877 as relate hereto are incorporated in the present specification. The use of the crystalline (meth)acrylic ester type polymer can be expected to improve various properties such as resistance to offset, mold release property, flowability, and charge initiating property.

The crystalline (meth)acrylic ester type polymer to be used as the offset preventing agent is such that a monomer represented by the following general formula (I) is contained as a component unit appropriately in a ratio in the range of 100–50 mol %, preferably 100–60 mol %, and more preferably 100–70 mol %

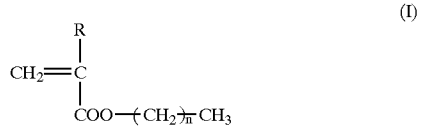

(wherein R represents a hydrogen atom or methyl group and n an integer in the range of 15–32, preferably 18–32, and more preferably 21–32).

As concrete examples of the monomer represented by the general formula (I) mentioned above, stearyl acrylate, stearyl methacrylate, hexadecyl acrylate, hexadecyl methacrylate, heptadecyl acrylate, heptadecyl methacrylate, nonadecyl acrylate, nonadecyl methacrylate, eicosyl acrylate, eicosyl methacrylate, behenyl acrylate, behenyl methacrylate, pentacyl acrylate, pentacyl methacrylate, heptacyl acrylate, heptacyl methacrylate, nonacyl acrylate, nonacyl methacrylate, dotriacontyl acrylate, and dotriacontyl methacrylate may be cited. Among other monomers cited above, stearyl acrylate, behanyl acrylate, behenyl methacrylate, pentacyl acrylate, and pentacyl methacrylate prove to be particularly advantageous.

As concrete examples of the monomer which is copolymerizable with the monomer represented by the general formula (I) mentioned above, styrene type monomers such as m-methyl styrene, p-methyl styrene, α-methyl styrene, p-methoxy styrene, p-tert-butyl styrene, p-phenyl styrene, o-chlorostyrene, m-chlorostyrene, and p-chlorostyrene; amorphous acrylic esters type or amorphous methacrylic ester type monomers such as methyl acrylate, ethyl acrylate, n-butyl acrylate, isobutyl acrylate, dodecyl acrylate, n-octyl acrylate, 2-ethylhexyl acrylate, phenyl acrylate, methyl a-chloroacrylate, ethyl methacrylate, propyl methacrylate, n-butyl methacrylate, isobutyl methacrylate, n-octyl methacrylate, dodecyl methacrylate, and 2-ethylhexyl methacrylate; acrylic acid type monomers such as acrylonitrile, methacrylonitrile, and acrylamide; vinyl ether type monomers such as vinyl methyl ether, vinyl isobutyl ether, and vinyl ethyl ether; vinyl ketone type monomers such as vinyl methyl ketone, vinyl ethyl ketone, and vinyl hexyl ketone; N-vinyl compound type monomers such as N-vinyl pyrrole, N-vinyl carbazole, N-vinyl indole, and N-vinyl pyrrolidone; and vinyl type monomers such as ethylene, propylene, butylene, vinyl chloride, and vinyl acetate may be cited.

The weight average molecular weight of the crystalline (meth)acrylic ester type polymer of the quality mentioned above is in the approximate range of 35000–500000, preferably 35000–450000, and more preferably 35000–400000. If the weight average molecular weight is less than 35000, the melt viscosity will be unduly low possibly to the extent of obstructing manifestation of the expected offset preventing effect and preventing the crystalline (meth) acrylic ester type polymer in the toner particles from exhibiting excellent dispersibility or the toner itself from offering ideal stability of storage. If this amount conversely exceeds 500000, the melt viscosity will be unduly high possibly to the extent of degrading the melt properties and precluding manifestation of the resistance to the phenomenon of offset.

In order that the toner to be produced may be effectively used at low temperatures, it is appropriate to use coumarone resin, epoxy resin, low molecular polystyrene, etc. in the place of or in combination with the offset preventing agent mentioned above.

As concrete examples of the charge controlling agent to be used for the purpose of obtaining a toner for use in static image development, nigrosine, monoazo dye, zinc, hexadecyl succinate, alkyl esters or alkyl amides of naphtheic acid, nitrohumic acid, N,N-tetramethyl diamine benzophenone, N,N-tetramethyl benzidine, triazine, and salicylic acidmetal complexes may be cited. For the reason to be adduced specifically herein below, it is more favorable to add externally the charge controlling agent to the resin particles obtained in consequence of the suspension polymerization than to add it to the suspension polymerization system while the polymerization is in process.

As the initiator for the polymerization under discussion, an oil-soluble peroxide type or azo type initiator which is in popular use for suspension polymerization can be used. As concrete examples of the polymerization initiator, such peroxide type initiators as benzoyl peroxide, lauroyl peroxide, octanoyl peroxide, benzoyl orthochloroperoxide, benzoyl orthomethoxy peroxide, methylethyl ketone peroxide, diisopropyl peroxy dicarbonate, cumene hydroperoxide, cyclohexanone peroxide, t-butyl hydroperoxide, and diisopropyl benzene hydroperoxide, and 2,2'-azobis-isobutyronitrile, 2,2'-azobis (2,4-dimethyl valero nitrile), 2,2'-azobis (2,3-dimethyl butyronitrile), 2,2'-azobis (2-methyl butyronitrile), 2,2'-azobis (2,3,3-trimethyl butyronitrile), 2,2'-azobis (2-isopropyl butyronitrile), 1,1'-azobis (cyclhexane-1-carbonitrile), 2,2'-azobis (4-methoxy-2,4-dimethyl valeronitrile), 2-(carbamoylazo) isobutyronitrile, 4,4'-azobis (4-cyanovaleric acid), and dimethyl-2,2'-azobis isobutyrate may be cited. The polymerization initiator is appropriately used in an amount in the range of 0.01–20% by weight, preferably 0.1–10% by weight.

The process for producing the resinous particles according to this invention comprises preparing a polymerizable monomer composition combining a polymerizable monomer of the quality described above with various other components, adding this composition to an inorganic dispersion stabilizer of the present invention described above or to an aqueous medium containing the stabilizer, stirring the resultant mixture thereby forming liquid drops (particles of the polymerizable monomer composition) of a particle diameter aimed at, and subjecting the reaction mixture to suspension polymerization. This suspension polymerization is advantageously carried out either after the particle diameter of the liquid drops has been regulated or while the regulation of the particle diameter is in process, preferably after the regulation of the particle diameter has been performed. The regulation of the particle diameter is effected, for example, by stirring with the T.K. Homomixer the suspension having prescribed component dispersed in an aqueous medium. It is otherwise effected by passing the suspension at least once through a high-speed stirring machine like a line mixer (such as, for example, Ebara Milder). Thus, the liquid drops mentioned above have the particle diameter regulated to a prescribed size falling in the approximate range of 0.1–500 μm, preferably 0.5–100 μm, and more preferably 0.5–50 μm.

In the process for producing the resinous particles of the present invention, the suspension polymerization system can further incorporate therein a surfactant while the polymerization is in process for the purpose of improving the stability of the polymerization. The surfactant thus used herein may be anionic surfactant, cationic surfactant, amphoteric surfactant, or nonionic surfactant, which ever best suits the occasion.

As concrete examples of the anionic surfactant, fatty acid oils such as sodium oleic acid and potassium castor oil, alkyl sulfuric ester salts such as sodium laureate and ammonium laureate, alkyl benzene sulfonates such as sodium dodecyl benzene sulfonate, and alkyl naphthalene sulfonates, alkane sulfonates, dialkyl sulfposuccinates, alkylphosphoric ester salts, naphthalene-formalin sulfonate condensate, polyoxyethylene alkylphenyl ether sulfuric ester salts, and polyoxyethylene alkyl sulfuric ester salts may be cited. As concrete examples of the nonionic surfactant, polyoxyethylene alkyl ethers, polyoxyethylene alkylphenyl ethers, polyoxyethylene fatty esters, sorbitan fatty esters, polyoxysorbitan fatty esters, polyoxyethylene alkyl amines, glycerin fatty esters, and oxyethylene-oxypropylene block polymers may be cited. As concrete examples of the cationic surfactant, alkylamine salts such as laurylamine acetate and stearylamine acetate, and quaternary ammonium salts such as lauryl trimethyl ammonium chloride may be cited. As concrete examples of the amphoteric surfactant, lauryl dimethylamine oxide, etc. may be cited.

Any of these surfactants can be incorporated in the polymerizable monomer composition in an amount in the range of 0–5% by weight, preferably 0.1–1% by weight, based on the weight of the composition.

In the process for producing the resinous particles according to this invention, the suspension polymerization system is allowed to incorporate further therein an emulsion polymerization inhibitor for the purpose of preventing the emulsion polymerization which possibly occurs concurrently in the aqueous phase during the suspension polymerization. As concrete examples of the emulsion polymerization inhibitor, such inorganic water-soluble inhibitors as ammonium thiocyanic acid, cupric chloride, copper acetate, vanadium pentoxide, sodium nitrite, potassium nitrite, potassium dichromate, potassium oxalate, and trisodium citrate, such water-soluble mercaptan compounds as 2-mercaptoethanol, thioglycolic acid, cysteine, glutathione, dimercaprol, 1,4-dithiothreitol, dimercapto succinic acid, and 2,3-dimercapto-1-propane sulfonic acid, and such metal complex compounds as ethylene diamine compound, water-soluble nigrosine, boron hydride, and monoazo dyes may be cited. The compounds which have at least one structural unit selected from the group consisting of —SH, —S—S—, —COOH, —NO$_2$, and —OH and exhibit substantially no solubility in water and sparing solubility in a polymerizable monomer as disclosed in JP-A-8-183,807 and the emulsion polymerization inhibitors which contain an aromatic compound containing at least one each of —NO$_2$, —SO$_3$Na, and secondary amino group as disclosed in JP-A-7-316,209 are other concrete examples of the emulsion polymerization inhibitor. Such disclosures of JP-A-8-183,807 and JP-A-7-316,209 as relate hereto are incorporated in the present specification.

The polymerization temperature is appropriately in the approximate range of 10–90° C., preferably 30–80° C., though it depends on the species of the polymerizable monomer to be used.

The resinous particles to be obtained by the aforementioned process for producing resinous particles of this invention have a volume average particle diameter in the approximate range of 0.1–500 μm, particularly 0.5–100 μm, and more particularly 0.5–50 μm and a very narrow particle diameter distribution (the ratio of volume average particle diameter/number average particle diameter) of not more than 1.6 because the liquid drops in the course of suspension polymerization have the dispersed state thereof retained with excellent stability owing to the action of the polymerization grade inorganic dispersion stabilizer of the quality described above.

Since the resinous particles obtained by the process for production according to this invention have an extremely narrow particle diameter distribution as described above, the produced resinous particles, when extracted in the form of dry particles, excel in flowability, show no sign of adhesion or coalition, and exhibit a good environmental property such as resistance to humidity on account of the fixation of the hydrophobic inorganic oxide added during the course of suspension polymerization on the surface of the resinous particles and, when required to disperse in a liquid, manifest a veritably excellent redispersibility. Since the resinous particles therefore excel in various physical properties such as thermal property, electric property, and power property, they are used perfectly in various applications. Owing to the very narrow particle diameter distribution, the resinous particles permit simplification of the step of classification, enjoy high yield, and excel in productivity.

For example, the colored resinous particles to be obtained by adding a coloring agent to the polymerizable monomer during the course of suspension polymerization can be used as a toner for the development of a static charge image.

The toner for use in the development of a static charge image according to this invention has a narrow particle diameter distribution and, therefore, permits simplification of the step of classification, enjoys high yield, and excels in productivity. Further, the resinous particles thus obtained have the electric properties thereof affected only sparingly by the environmental conditions because they have fixed on the surface thereof the hydrophobic inorganic oxide which has been used as one component of the dispersion stability. Further, the resinous particles, when expected to serve as a toner for the development of a static charge image, prove to be useful as the material for the toner for static charge image which manifests such outstanding image properties as stabilizing an image, exhibiting satisfactory repeatability of fine lines in the image, and precluding the phenomenon of fogging owing to an extremely narrow particle diameter distribution and excellent electric properties because they can be endowed with either positive charge or negative charge by properly selecting the species of a hydrophobic inorganic oxide to be used.

The toner for the development of a static charge image according to this invention if produced by using the colored resinous particles mentioned above. In order for the toner to acquire chargeability of an appropriate state, it is preferred to have a volume average particle diameter in the range of 3.5–20 μm, preferably 4–15 μm and a particle diameter distribution (the ratio of volume average particle diameter/ number average particle diameter) of not more than 1.6. The colored resinous particles may be used in the unmodified form as a toner for the development of a static charge image.

Optionally, such additives as charge controlling agent for the adjustment of charge and fluidifying agent which are normally used in ordinary toners may be suitably incorporated in the toner.

The method for effecting the incorporation of the charge controlling agent is not particularly restricted but may be selected from among all the heretofore known methods. A method which comprises causing the charge controlling agent to be contained in advance in the polymerization monomer when the polymerizable monomer having a coloring agent dispersed therein is subjected to polymerization and a method which comprises giving the colored resinous particles an after-treatment with the charge controlling agent thereby inducing fast deposition of the charge controlling agent on the surface of the colored resinous particles may be suitably adopted. Incidentally, in the process for producing resinous particles according to this invention, since the produced resinous particles can be charged in a positive or negative state or can be left uncharged in either a positive or negative state by selecting the species of the hydrophobic inorganic oxide to be used as described above, they are enabled to have the charge property thereof easily adjusted to a positive or negative charge even without using any charge controlling agent or by externally adding a charge controlling agent to the surface of resinous particles by the latter method.

The resinous particles which are obtained by suspension polymerization using as a polymerizable monomer a monomer containing a plurality of double bond groups in the molecular unit thereof either wholly alone or partly in a proportion of not less than 50% by weight can be used as a spacer for a liquid crystal display panel.

The colored resinous particles obtained by adding a coloring agent to the polymerizable monomer mentioned above can be used as a colored spacer for a liquid crystal display panel. Then, the colored resinous particles obtained by using a carbon black graft polymer as a coloring agent can be used as a colored spacer for a liquid crystal display panel of high reliability.

This spacer for use in a liquid crystal display panel according to this invention has a narrow particle diameter distribution and therefore permits simplification of the step of classification, enjoys a high yield, and excels in productivity and, when incorporated in a liquid crystal display panel, gives rise to no uneven gap, exhibits strength and hardness enough to facilitate gap control, entrains no leakage of light through the portions enveloping spacer particles, and therefore can be used advantageously for a liquid crystal display panel of high reliability. When this spacer contains a coloring agent, it can be advantageously used as a spacer for a liquid crystal display panel of high reliability allowing no leakage of light through the colored spacer particles.

The spacer of this invention for use in the liquid crystal display panel satisfies the requirements relating to the following characteristic properties: The number average particle diameter, though depending on the size and type of a liquid crystal to be used, falls generally in the range of 1–20 μm, preferably 1–15 μm, and particularly preferably 1.5–12 μm. This range is such that when the particle diameter deviates from this range, the spacer can no longer be used effectively in the liquid crystal display panel. The coefficient of variation (CV) of the spacer is not more than 10%, preferably not more than 8%, and more preferably not more than 6%. If the CV exceeds 10%, the spacer used in the liquid crystal display panel will encounter difficulty in retaining the thickness of the liquid crystal layer uniformly and constantly and tends to produce an uneven image.

The hardness (coefficient of elasticity after 10% compression) of the spacer is preferably in the range of 250–3000 kgf/mm$^2$, more preferably 250–2500 kgf/mm$^2$, and most preferably 300–2000 kgf/mm2. If the hardness is less than 250 kgf/mm$^2$, the problem ensues that the number of spacer particles scattered will increase to the extent of increasing the cost of production and aggravating the leakage of light through the portions enclosing the spacer particles and consequently degrading the contrast. Conversely, if the hardness exceeds 3000 kgf/mm$^2$, the disadvantage arises that the transparent electrode, oriented film, or color filter on the electrode substrate will possibly incur physical damage or low-temperature forming.

The breaking strength of the spacer is preferably not less than 2.1 gf, more preferably not less than 2.2 gf, and most preferably not less than 2.3 gf. If the breaking strength is less than 2.1 gf, the disadvantage arises that the cell gap will not be easily controlled and will induce an uneven cell gap.

When the spacer is endowed with adhesiveness, it effectively avoids migration and, when used in the construction of a liquid crystal panel, curbs the occurrence of an uneven color and, when used in a panel of a large surface area or on an automobile which is prone to bear such a load as vibration, avoids migration due to vibration and therefore proves to be particularly useful. The adhesive spacer has the surface thereof coated or grafted with such a thermoplastic resin as a (meth)acryl type resin, styrene type resin, or (meth)acryl-styrene type resin.

The adhesiveness imparted to the spacer brings about the advantage that it effectively precludes migration of the spacer during the assembly of cells, facilitates control of a cell gap, and allows no easy occurrence of an uneven gap.

The liquid crystal display panel of this invention will be described further in detail.

The liquid crystal display panel of this invention differs from the conventional liquid crystal display panel in respect that the spacer of this invention for use in the liquid crystal display panel described above is interposed in the place of the conventional spacer between the electrode substrates. It has the same or substantially the same gap distance as the particle diameter of the spacer. The amount of the spacer to be used is generally in the range of 30–1000 particles/mm$^2$, preferably 40–500 particles/mm$^2$, more preferably 50–400 particles/mm$^2$, and most preferably 60–300 particles/mm$^2$.

The liquid crystal display panel of this invention, for example, comprises a first electrode substrate, a second electrode substrate, a spacer for a liquid crystal display panel, a sealing material, and a liquid crystal. The first electrode substrate comprises a first transparent substrate and a first transparent electrode formed on one of the surfaces of the first transparent substrate. The second electrode substrate comprises a second transparent substrate and a second transparent electrode formed on one of the surfaces of the second transparent substrate. The second electrode substrate has the surface thereof seating the second transparent electrode opposed to the surface of the first electrode substrate seating the first transparent electrode substrate. The spacer for the liquid crystal display panel is a spacer of this invention for use in a liquid crystal display panel and is interposed between the first electrode substrate and the second electrode substrate. The sealing agent is intended to effect adhesion of the first electrode substrate and the second electrode substrate along the peripheral parts thereof. The liquid crystal is placed to fill the space which is enclosed with the first electrode substrate, the second electrode substrate, and the sealing agent.

In the liquid crystal display panel of this invention, the electrode substrates, sealing agent, and liquid crystal other than the spacer are the same as those used in the conventional liquid crystal display panel and they are be used by the same means. The electrode substrate comprises a transparent substrate such as a glass substrate or a film substrate and a transparent electrode formed on one of the surfaces of the transparent substrate and, as occasion demands, further comprises an oriented film formed so as to cover the surface of the transparent substrate with a transparent electrode. The sealing agent used herein may bean epoxy resin adhesive sealing agent, for example. The liquid crystal may be any of the liquid crystals popularly adopted heretofore. As concrete examples of the liquid crystal, the liquid crystals of the biphenyl type, phenyl cyclohexane type, Schiff's base type, azo type, azoxy type, benzoic ester type, terphenyl type, cyclohexyl carboxylic ester type, biphenyl cyclohexane type, pyrimidine type, dioxane type, cyclohexyl cyclohexane ester type, cyclohexyl ethane type, cyclohexene type, and fluorine type may be cited.

The liquid crystal display panel of this invention can be manufactured by the following method, for example. This invention does not limit the manufacture to this particular method. The spacer of this invention as an inplane spacer is uniformly scattered by the wet method or dry method on the electrode-containing surface of one of the two electrode substrates. Separately, a silica spacer is dispersed as a sealing part spacer in an adhesive sealing agent such as of an epoxy resin and the resultant dispersion is spread on the adhesive seal part of the other electrode substrate by such means as screen printing. Then, the two electrode substrates are superposed on each other and are thermally set under a proper pressure at a temperature in the range of 100–180° C. for a period in the range of 1–60 minutes. Subsequently, the liquid crystal is injected into the space and the injecting part is sealed to complete a liquid crystal display panel.

The liquid crystal display panel of this invention can be used in the same applications as the conventional liquid crystal display panel, i.e. image display elements such as TV, personal computers, and word processors or parts thereof. Particularly, the colored spacer is advantageously used for the LCD of normally black mode, especially for the STN-LCD.

The resinous particles obtained by using one vinyl type polymerizable monomer or a combination of two or more species of vinyl type polymerizable monomers in the suspension polymerization can be used as a spacer for a touch panel. A monomer having a plurality of double bond groups in the molecular unit may be used as a polymerizable monomer.

The space for the touch panel according to this invention has a narrow particle diameter distribution and therefore permits simplification of the step of classification, enjoys a high yield, and excels in productivity and, when used in the assembly of a touch panel, avoids degrading the accuracy of detection of the potential of the input, improves the resolution of fine lines of the input, enjoys good linearity of lines of the input, and moreover enables the electrodes to offer a highly satisfactory insulation and prevents the upper and lower substrates from defective contact or short circuit. Thus, it can be advantageously used as a spacer for a touch panel of high reliability and as a touch panel as well.

The spacer for the touch panel according to this invention satisfies the requirements relating to the following characteristic properties: The number average particle diameter, though variable with the size and type of the touch panel to be used, generally falls in the range of 1–100 μm, preferably 2–60 μm, and particularly preferably 5–50 μm. The coefficient of variation (CV) of the spacer is not more than 30%, preferably not more than 20%, and more preferably not more than 15%. If the CV exceeds 30%, the spacer used in the touch panel encounters difficulty in retaining uniformly and constantly the thickness of the gap between the transparent thin film electrodes formed on the surfaces of the opposed substrates. The touch panel in a portion having a large distance between the electrodes produces numerous dead points and suffers degradation of resolution and deficiency of linearity of the input. In a portion having a small distance, the touch panel has the problem of degrading the insulation between the electrodes and suffering easy contact between the electrodes even under a slight pressure and inducing an erroneous input.

When the spacer is endowed with adhesiveness, it effectively avoids migration and, when used in the construction of a touch panel, produces a touch panel which enjoys high linearity of the lines of the input, offers a fine touch for writing, and allows satisfactory insulation between the electrodes. As the adhesive spacer, what is obtained by coating or grafting the surface of a spacer with such a thermoplastic resin as (meth)acryl type resin, styrene type resin, or (meth)acryl-styrene type resin may be cited.

The touch panel of this invention has a transparent thin film electrode formed on the surface of a transparent substrate and the electrodes is opposed across an intervening space to the inner side of the substrate. Since the electrode is separated as described above, this touch panel has the spacer for a touch panel according to this invention interposed as an insulating spacer between the opposed substrates. Thus, the touch panel has a gap substantially equal to the particle diameter of the spacer particles.

The touch panel of this invention, for example, has a construction such that the insulating spacer for a touch panel is interposed between a substrate of transparent flexible conductive plastic and a substrate of transparent conductive glass orplastic. The transparent flexible conductive plastic substrate mentioned above comprises a transparent flexible conductive plastic substrate and a transparent thin film electrode of ITO, $In_2O_3$—$SnO_3$, $SnO_2$, etc., formed on one of, the opposite surfaces of the transparent substrate. In the touch panel, the transparent thin film electrode falls on the inner side and is opposed to one of the transparent conductive glass or plastic substrates. The transparent conductive glass or plastic substrate mentioned above comprises a transparent stationary substrate of transparent conductive glass or plastic and a transparent thin film electrode of ITO, $In_2O_3$—$SnO_2$, $SnO_2$,etc., formed on one of the surfaces of the transparent stationary substrate. In the touch panel, the transparent thin film electrode side fall on the inner side and is opposed to the transparent flexible plastic substrate. On the opposed surfaces of transparent flexible conductive plastic of the transparent thin film electrodes of transparent conductive glass or plastic, the spacer for a touch panel according to this invention is provided as an insulating space.

The touch panel of this invention can be manufactured by the following method, for example. This invention does not limit the manufacture to this particular method.

First, the spacer of this invention is uniformly spread by the wet method or dry method on the transparent thin film electrode of the transparent stationary substrate or it may be disposed at a prescribed position by the printing method.

The touch panel of this invention can be used in the same applications as the conventional touch panel, i.e., those resorting to the combination with the display screens of liquid crystal display, EL display, plasma display, CRT (Braun tube), etc. It can be used in numerous fields as a simple input device.

The resinous particles obtained by using one vinyl type polymerizable monomer or the combination of two or more species of vinyl type polymerizable monomers during the course of suspension polymerization, for example, can be used as conductive particles. A monomer having a plurality of double bond groups in the molecular unit thereof may be used as a polymerizable monomer.

The conductive particles of this quality according to this invention have a narrow particle diameter distribution and therefore permit simplification of the step of classification, enjoy a high yield, and excel in productivity and are usable advantageously as conductive particles which allow the distance between a pair of electrically connected electrodes to be easily retained constantly and prevent the electrodes from inferior connection.

The conductive particles of this invention comprise the resinous particles mentioned above and a conductive layer formed on the surface of the resinous particles and satisfy the requirements relating to the following characteristic properties: The number average particle diameter of the resinous particles, though variable with the purpose for which the conductive particles are used, generally fall in the range of 1–100 μm, preferably 2–60 μm, and particularly preferably 3–50 μm. The coefficient of variation (CV) of the resinous particles is not more than 30%, preferably not more than 20%, and more preferably not more than 15%. If the CV exceeds 30%, the distance between the electrodes will not be easily retained constant and will tend to induce defective contact.

The metal to be used in the conductive layer is any of the metals which are in popular use in the conventional conductive layer. As concrete examples of the metal, nickel, gold, silver, copper, and indium and alloys thereof maybe cited. Among other metals cited, nickel, gold, and indium prove to be particularly advantageous on account of high conductivity.

The thickness of the conductive layer imposes no particular restriction but requires only to offer thorough conductivity. It is preferred to be in the range of 0.01–5 μm, especially 0.02–2 μm. If this thickness is below the range mentioned above, the conductive layer will be possibly deficient in conductivity. If it is above the range, the conductive layer will tend to peel on account of the difference in the ratio of thermal expansion between the particles and the conductive layer. One conductive layer suffices or two or more conductive layers suffice, depending on occasion. Where the number of conductive layers exceeds 2, layers formed of a different conductor may be disposed above or below.

The conductive particles of this invention comprise resinous particles mentioned above and a conductive layer formed on the surface of the resinous particles. The conductive layer is formed on the surface of the resinous particles by any of the well-known methods. This invention does not discriminate the conductive layer on account of the kind of method used for this purpose. As concrete examples of the method, the chemical plating (electroless plating) method, coating method, and PVD (vacuum deposition, sputtering, ion plating, etc.) method may be cited. Among other methods mentioned above, the chemical plating method proves to be particularly advantageous in respect that it allows the conductive particles of this invention to be easily obtained.

Since the conductive particles of this invention which are obtained as described above have the characteristics of the resinous particles mentioned above, they allow the distance between a pair of electrically connected electrodes to be easily retained constantly and do not easily suffer the electrodes to incur inferior contact. Thus, they are particularly useful as an electric contact material for such electronic devices as liquid display panel, LSI, and printed wiring board.

When the hydrophobic inorganic oxide which is used as a polymerization degree dispersion stabilizer is abhorred by a particular application, it maybe removed from the stabilizer. This removal is effected preferably by acid washing or alkali washing which is capable of easily solving the oxide in question. When hydrophobic silica, for example, is used as the hydrophilic inorganic oxide, the removal is easily attained by adding such an alkali as sodium hydroxide to the suspension arising after completion of the polymerization reaction or separating the resinous particles from the aqueous medium by a proper technique such as filtration or centrifugation and washing the separated resinous particles with an alkali. Then, the resinous particles are washed further in water so as to remove the alkali such as sodium hydroxide which still persists on the washed resinous particles. As a result, the resinous particles which have the hydrophobic inorganic oxide no longer fixed on the surface thereof can be obtained.

The resinous particles of this invention can be incorporated in a resinous composition. This resinous composition can be used advantageously in various applications, such as blocking preventing agent and slip improving agent for shaped articles of film, light diffusing agent for transparent resin, delustering agent, coloring agent for thermoplastic resin and thermosetting resin in a state containing a coloring agent, coating composition, additive for facing panels, additive for man-made marble, a filler for chromatographic column in a state containing or not containing a coloring agent, additive for the toner to be used in the development of a static charge image, display particles for a coulter counter, carrier for immunity diagnostic medicine, filler for cosmetic articles, paper treating agent, and powder coating material.

EXAMPLES

This invention will be described more specifically below with reference to working examples. It should be noted, however, that this invention is not limited in any sense by these working examples. Wherever the term "parts" is used in the following examples invariably refers to "parts by weight."

Synthesis Example 1

Example of synthesis of treated carbon black

A flask provided with a stirrer, an inert gas inlet tube, a reflux condenser, and a thermometer was charged with 400 parts of deionized water having 0.2 part of polyvinyl alcohol solved therein. A mixture having 16 parts of benzoyl peroxide solved in a polymerizable monomer prepared in advance of 194.9 parts of styrene and 5.1 parts of glycidyl methacrylate was added to the flask and stirred at a high speed to form a homogeneous suspension. Then, the suspension was heated to 80° C. as swept with nitrogen gas, stirred continuously at this temperature for five hours to effect a reaction of polymerization, and subsequently cooled to obtain a polymer suspension. This polymer suspension was filtered, washed, and then dried to obtain a polymer containing in the molecular unit thereof one epoxy group on the average as a reactive group. This polymer was found by the GPC determination to have a number average molecular weight, Mn=5,500.

By the use of Laboplast Mill (produced by Toyo Seiki K.K.), 40 parts of the polymer containing in the molecular unit thereof one epoxy group on the average as a reactive group and 20 parts of carbon black, MA-100R (produced by Mitsubishi Kagaku K.K.), were kneaded under the conditions of 160° C. and 100 rpm to effect a reaction, cooled, and pulverized to obtain a treated carbon black (1).

Example 1

In a high shear mixing device, T.K. Homomixer (produced by Tokushu Kika Kogyo K.K.), 6 parts of finely pulverized hydrophobic negatively charging silica (Aerosil R976 produced by Nippon Aerosil K.K.) was thrown into an aqueous medium composed of 30 parts of ethyl alcohol and 120 parts of deionized water and they were stirred together at 4000 rpm for five minutes to prepare an aqueous dispersion having the hydrophobic negatively charging silica homogeneously dispersed therein. When this aqueous dispersion of the hydrophobic negatively charging silica was observed under an optical microscope (1000 magnifications), the hydrophobic negatively charging silica was found to be finely dispersed uniformly therein and coarse particles exceeding 1 µm in diameter were not detected.

| | |
|---|---|
| Styrene | 85 parts |
| n-Butyl acrylate | 15 parts |
| Divinyl benzene | 0.3 part |
| Carbon black (MA100S, produced by Mitsubishi Kagaku K.K.) | 10 parts |
| Low molecular polystyrene (Himer ST-120, produced by Sanyo Kasei Kogyo K.K., Mw = 10000)) | 5 parts |
| Polyethylene wax (Mitsui Hi-wax 200P, produced by Mitsui Sekiyukagaku Kogyo K.K. Mn = 2000) | 3 parts |
| 2,2'-Azobis-isobutyronitrile | 1 part |
| 2,2'-Azobis(2,4-dimethyl valeronitrile) | 2 parts |

By the use of Pearl Mill (produced by Ashizawa K.K.), the olymerizable monomer composition shown above was mixed at 30° C. for a vessel retention time of 30 minutes to prepare a dispersion of the polymerizable monomer composition having the pigments mentioned above homogeneously dispersed therein. When this dispersion of the polymerizable monomer composition was observed under an optical microscope (1000 magnifications), the carbon black was found to be finely dispersed uniformly therein and coarse particles exceeding 1 µm in diameter were not detected.

Then, by the use of a mixer of high shear strength, T.K. Homomixer (produced by Tokushu Kika Kogyo K.K.), the dispersion of the hydrophobic negatively charging silica prepared as described above and the dispersion of the polymerizable monomer composition obtained as described above and 300 parts of deionized water were together stirred at room temperature at 10000 rpm for 10 minutes to form liquid drops of the polymerizable monomer composition (particles of monomer composition).

The aqueous dispersion of the polymerizable monomer composition consequently obtained was placed in a reaction vessel equipped with stirring blades, kept stirred uniformly so as not to induce sedimentation of the monomer composition particles and, after addition of 30 parts of deionized water having 0.4 part of polyoxyethylene alkyl sulfoammonium (Hitenol N-08, produced byDaiichi Kogyo Seiyaku K.K.), heated to 75° C. under an atmosphere of nitrogen, and continuously stirred at this temperature for 6 hours until completion of a suspension polymerization.

The aqueous dispersion of the polymer composition obtained consequently was cooled to room temperature (below 40° C.), left undergoing solid-liquid separation, washed repeatedly with water, and dried to obtain minute resinous particles (1) of this invention.

When the minute resinous particles (1) thus obtained were tested for particle diameter by the use of Coulter Counter (produced by Nikka Kisha K.K., aperture 100 µm), they were found to have a volume average particle diameter (dv) of 9.9 µm, contain minute particle diameters and coarse particle diameters only sparingly, and have a narrow particle diameter distribution as evinced by the fact that the ratio of the volume average particle diameter to the number average particle diameter (dp), (dv/dp), was 1.36.

When the minute resinous particles (1) were tested for volume specific resistivity by the use of a dielectric loss tester (TR-1100, produced by Ando Denki K.K.) under the conditions of 25° C. of temperature and 1 kHz of frequency, they were found to have a volume specific resistivity of $5.1 \times 10^{10}$ ω·cm.

When the minute resinous particles (1) were observed under an optical microscope (1000 magnifications), the individual particles were found to be perfectly black spheres showing no sign of maldistribution of carbon black therein.

A binary developing agent was produced by mixing 30 parts of the minute resinous particles (1) and 720 parts of a ferrite carrier coated with a styrene acryl resin. When this developing agent was used to copy an image with a copying device, Leodry 7610 (produced by Toshiba K.K.), under the conditions of 60% of humidity and normal room temperature to rate the copied images, images having high image density, showing no sign of fogging or uneven density, and manifesting very satisfactory resolution were obtained. When the copying was continued, the produced images had a sharp and high density and showed practically no intolerable deterioration of image. When the evaluation of copied images was conducted in an environment of 35° C. of temperature and 85% of humidity, the produced images were found to be on a par with those obtained in an environment of normal temperature and normal humidity.

Example 2

Minute resinous particles (2) of this invention were obtained by following the procedure of Example 1 while changing the amount of ethyl alcohol to 60 parts.

When the minute resinous particles (2) thus obtained were tested for particle diameter by the use of Coulter Counter (produced by Nikka Kisha K.K., aperture 100 µm), they were found to have a volume average particle diameter (dv) of 8.6 µm, contain minute particle diameters and coarse particle diameters only sparingly, and have a narrow particle diameter distribution as evinced by the fact that the ratio of the volume average particle diameter to the number average particle diameter (dp), (dv/dp), was 1.41.

When the minute resinous particles (2) were tested for volume specific resistivity by the use of a dielectric loss tester (TR-1100, produced by Ando Denki K.K.) under the conditions of 25° C. of temperature and 1 kHz of frequency, they were found to have a volume specific resistivity of $5.3 \times 10^{10}$ ω·cm.

When the minute resinous particles (2) were observed under an optical microscope (1000 magnifications), the individual particles were found to be perfectly black spheres showing no sign of maldistribution of carbon black therein.

When the minute resin particles (2) were subjected to the same evaluation of image by following the procedure of Example 1, the produced images were found to have high density, show no sign of fogging and uneven density, and manifest very satisfactory resolution equally under the conditions of normal temperature and normal humidity and under the conditions of high temperature and high humidity. In the evaluation by continued copying, the produced images had a sharp and high density and showed practically no intolerable deterioration of image.

Example 3

In a high shear mixing device, T.K. Homomixer (produced by Tokushu Kika Kogyo K.K.), 6 parts of finely pulverized hydrophobic positively charging silica (Aerosil RA200H produced by Nippon Aerosil K.K.) was thrown into an aqueous medium composed of 50 parts of ethyl alcohol and 150 parts of deionized water and they were stirred together at 4000 rpm for five minutes to prepare an aqueous dispersion having the hydrophobic positively charging silica homogeneously dispersed therein. When this aqueous dispersion of the hydrophobic positively charging silica was observed under an optical microscope (1000 magnifications), the hydrophobic positively charging silica was found to be finely dispersed uniformly therein and coarse particles exceeding 1 μm in diameter were not detected.

| | |
|---|---|
| Styrene | 85 parts |
| n-Butyl acrylate | 15 parts |
| Divinyl benzene | 0.3 part |
| Carbon black (MA100S, produced by Mitsubishi Kagaku K.K.) | 10 parts |
| Low molecular polystyrene (Himer SB-130, produced by Sanyo Kasei Kogyo K.K., Mw = 46000)) | 5 parts |
| Stearyl acrylate polymer (ST-100, produced by Nippon Shokubai Kakaku Kogyo Co., Ltd., Mw = 100000) | 3 parts |
| 2,2'-Azobis-isobutyronitrile | 1 part |
| 2,2'-Azobis (2,4-dimethyl valeronitrile) | 2 parts |

By the use of Pearl Mill (produced by Ashizawa K.K.), the olymerizable monomer composition shown above was mixed at 30° C. for a vessel retention time of 30 minutes to prepare a dispersion of the polymerizable monomer composition having the pigments mentioned above homogeneously dispersed therein. When this dispersion of the polymerizable monomer composition was observed under an optical microscope (1000 magnifications), the carbon black was found to be finely dispersed uniformly therein and coarse particles exceeding 1 μm in diameter were not detected.

Then, by the use of a mixer of high shear strength, T.K. Homomixer (produced by Tokushu Kika Kogyo K.K.), the dispersion of the hydrophobic positively charging silica prepared as described above and the dispersion of the polymerizable monomer composition obtained as described above and 250 parts of deionized water were together stirred at room temperature at 10000 rpm for 10 minutes to form liquid drops of the polymerizable monomer composition (particles of monomer composition).

The aqueous dispersion of the polymerizable monomer composition consequently obtained was placed in a reaction vessel equipped with stirring blades, kept stirred uniformly so as not to induce sedimentation of the monomer composition particles and, after addition of 30 parts of deionized water having 0.6 part of polyoxyethylene nonylphenyl ether (Noigen EA-170, produced by Daiichi Kogyo Seiyaku K.K.), heated to 75° C. under an atmosphere of nitrogen, and continuously stirred at this temperature for 6 hours until completion of a suspension polymerization.

The aqueous dispersion of the polymer composition obtained consequently was subjected to the procedure of Example 1 to obtain minute resinous particles (3) of this invention.

When the minute resinous particles (3) thus obtained were tested for particle diameter by the use of Coulter Counter (produced by Nikka Kisha K.K., aperture 100 μm), they were found to have a volume average particle diameter (dv) of 10.5 μm, contain minute particle diameters and coarse particle diameters only sparingly, and have a narrow particle diameter distribution as evinced by the fact that the ratio of the volume average particle diameter to the number average particle diameter (dp), (dv/dp), was 1.30.

When the minute resinous particles (3) were tested for volume specific resistivity by the use of a dielectric loss tester (TR-1100, produced by Ando Denki K.K.) under the conditions of 25° C. of temperature and 1 kHz of frequency, they were found to have a volume specific resistivity of $4.9 \times 10^{10}$ ω·cm.

When the minute resinous particles (3) were observed under an optical microscope (1000 magnifications), the individual particles were found to be perfectly black spheres showing no sign of maldistribution of carbon black therein.

A binary developing agent was produced by mixing 30 parts of the minute resinous particles (3) and 720 parts of a ferrite carrier coated with a silicone type resin. When this developing agent was used to copy an image with a copying device, NP-200J (produced by Canon Inc.) under the conditions of 25° C. of temperature and 60% of humidity to rate the copied images, images having high image density, showing no sign of fogging or uneven density, and manifesting very satisfactory resolution were obtained. When the copying was continued, the produced images had a sharp and high density and showed practically no intolerable deterioration of image. When the evaluation of copied images was conducted in an environment of 35° C. of temperature and 85% of humidity, the produced images were found to be on a par with those obtained in an environment of normal temperature and normal humidity.

Example 4

In a high shear mixing device, T.K. Homomixer (produced by Tokushu Kika Kogyo K.K.), 3 parts of finely pulverized hydrophobic silica (Aerosil R812 produced by Nippon Aerosil K.K.) was thrown into an aqueous medium composed of 30 parts of ethyl alcohol and 150 parts of deionized water and they were stirred together at 4000 rpm for 10 minutes to prepare an aqueous dispersion having the hydrophobic silica homogeneously dispersed therein. When this aqueous dispersion of the hydrophobic silica was observed under an optical microscope (1000 magnifications), the hydrophobic silica was found to be finely dispersed uniformly therein and coarse particles exceeding 1 μm in diameter were not detected.

In a high shear mixing device, T.K. Homomixer (produced by Tokushu Kika Kogyo K.K.), a polymerizable monomer composition prepared in advance by combining 90 parts of styrene, 10 parts of divinyl benzene, and 1 part of benzoyl peroxide was placed, 350 parts of deionized water was added thereto, and they were stirred together at 8000 rpm for 10 minutes to produce liquid drops of the polymerizable monomer composition (particles of the monomer composition).

The aqueous dispersion of the polymerizable monomer composition consequently obtained was placed in a reaction vessel equipped with stirring blades, kept stirred uniformly so as not to induce sedimentation of the monomer composition particles and heated to 70° C. under an atmosphere of nitrogen, and continuously stirred at this temperature for 8 hours until completion of a suspension polymerization.

The aqueous dispersion of the polymer composition obtained consequently was cooled to room temperature, left undergoing solid-liquid separation, washed repeatedly with water, and dried to obtain minute resinous particles (4) of this invention.

When the minute resinous particles (4) thus obtained were tested for particle diameter by the use of Coulter Counter (produced by Nikka Kisha K.K., aperture 100 μm), they were found to have a volume average particle diameter (dv) of 15.2 μm, contain minute particle diameters and coarse particle diameters only sparingly, and have a narrow particle diameter distribution as evinced by the fact that the ratio of the volume average particle diameter to the number average particle diameter (dp), (dv/dp), was 1.38.

Example 5

Minute resinous particles (5) of this invention were obtained by following the procedure of Example 4 while using 6 parts of finely pulverized hydrophobic silica (Aerosil RX200, produced by Japan Aerosil K.K.), 30 parts of methyl alcohol, and 100 parts of deionized water instead.

When the minute resinous particles (5) thus obtained were tested for particle diameter by the use of Coulter Counter (produced by Nikka Kisha K.K., aperture 100 μm), they were found to have a volume average particle diameter (dv) of 6.8 μm, contain minute particle diameters and coarse particle diameters only sparingly, and have a narrow particle diameter distribution as evinced by the fact that the ratio of the volume average particle diameter to the number average particle diameter (dp), (dv/dp), was 1.23.

Example 6

In a high shear mixing device, T.K. Homomixer (produced by Tokushu Kika Kogyo K.K.), 8 parts of finely pulverized hydrophobic silica (Aerosil R972 produced by Nippon Aerosil K.K.) was thrown into an aqueous medium composed of 40 parts of ethyl alcohol and 100 parts of deionized water and they were stirred together at 4000 rpm for 10 minutes to prepare an aqueous dispersion having the hydrophobic silica homogeneously dispersed therein. When this aqueous dispersion of the hydrophobic silica was observed under an optical microscope (1000 magnifications), the hydrophobic silica was found to be finely dispersed uniformly therein and coarse particles exceeding 1 μm in diameter were not detected.

In a high shear mixing device, T.K. Homomixer (produced by Tokushu Kika Kogyo K.K.), a polymerizable monomer composition prepared in advance by combining 90 parts of methyl methacrylate, 10 parts of trimethylol propane trimethacrylate, and 1 part of 2,2'-azobis-isobutyronitrile was placed, 250 parts of deionized water was added thereto, and they were stirred together at 10000 rpm for 10 minutes to produce liquid drops of the polymerizable monomer composition (particles of the monomer composition).

The aqueous dispersion of the polymerizable monomer composition consequently obtained was placed in a reaction vessel equipped with stirring blades, kept stirred uniformly so as not to induce sedimentation of the monomer composition particles and, after addition of 30 parts of deionized water having 1 part of polyvinyl alcohol (PVA205, produced by Kuraray Co., Ltd.) solved in advance therein, heated to 70° C. under an atmosphere of nitrogen, and continuously stirred at this temperature for 5 hours until completion of a suspension polymerization.

The aqueous dispersion of the polymer composition obtained consequently was cooled to room temperature, left undergoing solid-liquid separation, washed with water, and dried to obtain minute resinous particles (6) of this invention.

When the minute resinous particles (6) thus obtained were tested for particle diameter by the use of Coulter Counter (produced by Nikka Kisha K.K., aperture 100 μm), they were found to have a volume average particle diameter (dv) of 5.7 μm, contain minute particle diameters and coarse particle diameters only sparingly, and have a narrow particle diameter distribution as evinced by the fact that the ratio of the volume average particle diameter to the number average particle diameter (dp), (dv/dp), was 1.50.

Example 7

Minute resinous particles (7) of this invention were obtained by repeating the procedure of Example 6 while using 5 parts of finely pulverized hydrophobic silica (Aerosil R974, produced by Japan Aerosil K.K.), 50 parts of isopropyl alcohol, and 100 parts of deionized water.

When the minute resinous particles (7) thus obtained were tested for particle diameter by the use of Coulter Counter (produced by Nikka Kisha K.K., aperture 100 μm), they were found to have a volume average particle diameter (dv) of 7.2 μm, contain minute particle diameters and coarse particle diameters only sparingly, and have a narrow particle diameter distribution as evinced by the fact that the ratio of the volume average particle diameter to the number average particle diameter (dp), (dv/dp), was 1.43.

Example 8

In a high shear mixing device, T.K. Homomixer (produced by Tokushu Kika Kogyo K.K.), 2 parts of finely pulverized hydrophobic silica (Aerosil R200H, produced by Nippon Aerosil K.K.) was thrown into an aqueous medium composed of 10 parts of ethyl alcohol and 100 parts of deionized water and they were stirred together at 4000 rpm for 10 minutes to prepare an aqueous dispersion having the hydrophobic silica homogeneously dispersed therein. When this aqueous dispersion of the hydrophobic silica was observed under an optical microscope (1000 magnifications), the hydrophobic silica was found to be finely dispersed uniformly therein and coarse particles exceeding 1 μm in diameter were not detected.

| | |
|---|---|
| Styrene | 80 parts |
| Divinyl benzene | 10 parts |
| Low molecular polystyrene (Himer SB-130, produced by Sanyo Kasei Kogyo K.K., Mw = 46000) | 10 parts |
| Benzoyl peroxide | 1 part |

In a high shear mixing device, T.K. Homomixer (produced by Tokushu Kika Kogyo K.K.), the aforementioned polymerizable monomer composition prepared in advance was placed and stirred at 3000 rpm for 5 minutes to produce liquid drops of the polymerizable monomer composition (particles of the monomer composition).

The aqueous dispersion of the polymerizable monomer composition consequently obtained was placed in a reaction vessel equipped with stirring blades, kept stirred uniformly so as not to induce sedimentation of the monomer composition particles and heated to 70° C. under an atmosphere of nitrogen, and continuously stirred at this temperature for 8 hours until completion of a suspension polymerization.

The aqueous dispersion of the polymer composition obtained consequently was cooled to room temperature, combined with sodium hydroxide to effect solution of the hydrophobic silica, left undergoing solid-liquid separation, washed with water, and dried to obtain minute resinous particles (8) of this invention.

When the minute resinous particles (8) thus obtained were tested for particle diameter by the use of Coulter Counter (produced by Nikka Kisha K.K., aperture 200 µm), they were found to have a volume average particle diameter (dv) of 38.0 µm, contain minute particle diameters and coarse particle diameters only sparingly, and have a narrow particle diameter distribution as evinced by the fact that the ratio of the volume average particle diameter to the number average particle diameter (dp), (dv/dp), was 1.40.

Example 9

Minute resinous particles (9) of this invention was obtained by following the procedure of Example 8 while using a polymerizable monomer composition combining 90 parts of styrene, 10 parts of divinyl benzene, and 1 part of benzoyl peroxide.

When the minute resinous particles (9) thus obtained were tested for particle diameter by the use of Coulter Counter (produced by Nikka Kisha K.K., aperture 200 µm), they were found to have a volume average particle diameter (dv) of 47.2 µm, contain minute particle diameters and coarse particle diameters only sparingly, and have a narrow particle diameter distribution as evinced by the fact that the ratio of the volume average particle diameter to the number average particle diameter (dp), (dv/dp), was 1.52.

Example 10

In a high shear mixing device, T.K. Homomixer (produced by Tokushu Kika Kogyo K.K.), 5 parts of finely pulverized hydrophobic silica (Aerosil R976, produced by Nippon Aerosil K.K.) was thrown into an aqueous medium composed of 25 parts of methyl alcohol and 100 parts of deionized water and they were stirred together at 4000 rpm for 5 minutes to prepare an aqueous dispersion having the hydrophobic silica homogeneously dispersed therein. When this aqueous dispersion of the hydrophobic silica was observed under an optical microscope (1000 magnifications), the hydrophobic silica was found to be finely dispersed uniformly therein and coarse particles exceeding 1 µm in diameter were not detected.

| | |
|---|---|
| Divinyl benzene | 85 parts |
| Treated carbon black (1) obtained in Synthesis Example 1 | 15 parts |
| Benzoyl peroxide | 1 part |

In a high shear mixing device, T.K. Homomixer (produced by Tokushu Kika Kogyo K.K.), the aforementioned polymerizable monomer composition prepared in advance was placed and stirred at 7000 rpm for 5 minutes to produce liquid drops of the polymerizable monomer composition (particles of the monomer composition).

The aqueous dispersion of the polymerizable monomer composition consequently obtained was placed in a reaction vessel equipped with stirring blades, kept stirred uniformly so as not to induce sedimentation of the monomer composition particles and heated to 75° C. under an atmosphere of nitrogen, and continuously stirred at this temperature for 8 hours until completion of a suspension polymerization.

The aqueous dispersion of the polymer composition obtained consequently was cooled to room temperature, combined with sodium hydroxide to effect solution of the hydrophobic silica, left undergoing solid-liquid separation, washed with water, and dried to obtain minute resinous particles (10) of this invention.

When the minute resinous particles (10) thus obtained were tested for particle diameter by the use of Coulter Counter (produced by Nikka Kisha K.K., aperture 50 µm), they were found to have a volume average particle diameter (dv) of 6.02 µm, contain minute particle diameters and coarse particle diameters only sparingly, and have a narrow particle diameter distribution as evinced by the fact that the ratio of the volume average particle diameter to the number average particle diameter (dp), (dv/dp), was 1.21.

Then, a colored spacer (10) was obtained by classifying the minute resinous particles (10) obtained as described above until a particle diameter aimed at. While a complicated operation of classification would be required where a particle diameter distribution was wide, the minute resinous particles (10) only required one simple operation of classification because the particle diameter distribution was narrow. The colored spacer (10) thus obtained was found to have a number average particle diameter of 5.95 µm, a coefficient of variation of particle diameter of 3.3%. a breaking strength of particle of 4.1 gf, and rigidity (coefficient of elasticity after 10% compression) of 470 kgf/mm$^2$.

Then, a liquid crystal display panel was manufactured by the following method using the colored spacer (10). First, as illustrated in FIG. 1, an electrode (a transparent electrode, for example) 5 and a polyimide oriented film 4 were formed on a lower glass substrate 111 and the superposed layers were subjected to rubbing to obtain a lower electrode substrate 110. On this lower electrode substrate 110, the colored spacer (10) (inplane spacer in this case) 8 was uniformly scattered by the weight scattering method in a scatter density of 200 particles/mm$^2$ without inducing aggregation. The liquid for wet scattering was prepared by using a water/isopropyl alcohol (IPA) (volumetric ratio: 1/1) as a solvent and mixing 100 parts of water/IPA and 2.5 parts of the colored spacer (10) and was dispersed by an ultrasonic wave. In this case, the solvent used for the wet scattering defied coloration and remained clear (the colored spacer showed no sign of color separation).

Meanwhile, an electrode (a transparent electrode, for example) 5 and a polyimide oriented film 4 were formed on an upper glass substrate 12 and the superposed layers were rubbed to obtain an upper electrode substrate 120. Then, a dispersion having a silica spacer (sealing part spacer in this case) 3 dispersed at a ratio of 30% by volume in an epoxy resin adhesive sealing material 2 was applied by screen printing to the adhesive sealing part of the upper electrode substrate 120.

Finally, the upper and lower electrode substrates 110 and 120 were pressed against each other, with the electrode 5 and the oriented film 4 opposed to each other, through the medium of the spacer (10) 8 of this invention. The superposed electrode substrates were heated under a pressure of 1 kg/cm$^2$ at a temperature of 150° C. for 30 minutes to set thermally the adhesive sealing material 2. Thereafter, the gap between the two electrode substrates 110 and 120 was evacuated and then allowed to resume the atmospheric pressure to induce injection of an STN type liquid crystal 7 and closure of the injecting part. Then, PVA (polyvinyl alcohol) type polarizing films 6 were stuck one each to the outsides of the upper and lower glass substrates 12 and 111 to complete a 13-inch liquid crystal display panel (1).

The liquid crystal display panel (1) thus obtained had a uniformized distance between the upper and lower substrates, allowed no leakage of light through the spacer particles, repressed leakage of light through the portions surrounding the spacer particles, and enjoyed superior display quality.

Further, the panel (1) could be driven for a long time under an impressed proper voltage.

Example 11

In a high shear mixing device like T.K. Homomixer (produced by Tokushu Kika Kogyo K.K.), 3 parts of finely pulverized hydrophobic silica (Aerosil R976, produced by Nippon Aerosil K.K.) was thrown into an aqueous medium composed of 20 parts of methyl alcohol and 100 parts of deionized water and they were stirred together at 4000 rpm for 10 minutes to prepare an aqueous dispersion having the hydrophobic silica homogeneously dispersed therein. When this aqueous dispersion of the hydrophobic silica was observed under an optical microscope (1000 magnifications), the hydrophobic silica was found to be finely dispersed uniformly therein and coarse particles exceeding 1 $\mu$m in diameter were not detected.

In a high shear mixing device, T.K. Homomixer (produced by Tokushu Kika Kogyo K.K.), a polymerizable monomer composition prepared in advance by combining 90 parts of styrene, 10 parts of divinyl benzene, and 3 parts of benzoyl peroxide was placed and, after addition of 500 parts of deionized water, stirred at 3000 rpm for 20 minutes to produce liquid drops of the polymerizable monomer composition (particles of the monomer composition).

The aqueous dispersion of the polymerizable monomer composition consequently obtained was placed in a reaction vessel equipped with stirring blades, kept stirred uniformly so as not to induce sedimentation of the monomer composition particles and heated to 75° C. under an atmosphere of nitrogen, and continuously stirred at this temperature for 6 hours until completion of a suspension polymerization.

The aqueous dispersion of the polymer composition obtained consequently was cooled to room temperature, combined with sodium hydroxide to effect solution of the hydrophobic silica, left undergoing solid-liquid separation, washed with water, and dried to obtain minute resinous particles (11) of this invention.

When the minute resinous particles (11) thus obtained were tested for particle diameter by the use of Coulter Counter (produced by Nikka Kisha K.K., aperture 200 $\mu$m), they were found to have a volume average particle diameter (dv) of 21.9 $\mu$m, contain minute particle diameters and coarse particle diameters only sparingly, and have a narrow particle diameter distribution as evinced by the fact that the ratio of the volume average particle diameter to the number average particle diameter (dp), (dv/dp), was 1.17.

Then, a spacer (11) for a touch panel was obtained by classifying the minute resinous particles (11) obtained as described above until a particle diameter aimed at. While a complicated operation of classification would be required where a particle diameter distribution was wide, the minute resinous particles only required one simple operation of classification because the particle diameter distribution was narrow. When the spacer (11) for a touch panel thus obtained was tested for particle diameter by the use of Coulter Counter (produced by Nikka Kisha K.K., aperture 200 $\mu$m), it was found to have a number average particle diameter of 22.6 $\mu$m and a coefficient of variation of particle diameter of 9.8%.

Then, a transparent touch panel was manufactured by the following method using the spacer (11) for a touch panel. First, the spacer (11) for a touch panel was uniformly scattered with the aid of a spray at a scatter density of 20 particles/mm$^2$ on a transparent thin film electrode formed on one of the surfaces of a transparent conductive glass substrate. Further, a touch panel (1) was obtained by sticking transparent conductive films of polyethylene terephthalate having a transparent thin film electrode formed on one surface in such a manner that the transparent thin film electrodes formed on the surfaces of the substrates were opposed inside to each other.

The touch panel (1) consequently obtained has a uniformized distance between the substrates thereof, enjoyed high linearity of the lines of the input, offered perfect touch for writing, exhibited a satisfactory insulating property, precluded incorrect input.

Example 12

In a high shear mixing device like T.K. Homomixer (produced by Tokushu Kika Kogyo K.K.), 8 parts of finely pulverized hydrophobic silica (Aerosil R976, produced by Nippon Aerosil K.K.) was thrown into an aqueous medium composed of 50 parts of methyl alcohol and 150 parts of deionized water and they were stirred together at 5000 rpm for 10 minutes to prepare an aqueous dispersion having the hydrophobic silica homogeneously dispersed therein. When this aqueous dispersion of the hydrophobic silica was observed under an optical microscope (1000 magnifications), the hydrophobic silica was found to be finely dispersed uniformly therein and coarse particles exceeding 1 $\mu$m in diameter were not detected.

In a high shear mixing device, T.K. Homomixer (produced by Tokushu Kika Kogyo K.K.), a polymerizable monomer composition prepared in advance by combining 80 parts of styrene, 20 parts of divinyl benzene, and 2 parts of benzoyl peroxide was placed and, after addition of 400 parts of deionized water, stirred at 10000 rpm for 10 minutes to produce liquid drops of the polymerizable monomer composition (particles of the monomer composition).

The aqueous dispersion of the polymerizable monomer composition consequently obtained was placed in a reaction vessel equipped with stirring blades, kept stirred uniformly so as not to induce sedimentation of the monomer composition particles and heated to 75° C. under an atmosphere of nitrogen, and continuously stirred at this temperature for 8 hours until completion of a suspension polymerization.

The aqueous dispersion of the polymer composition obtained consequently was cooled to room temperature, combined with sodium hydroxide to effect solution of the hydrophobic silica, left undergoing solid-liquid separation, washed with water, and classified to separate particles of a diameter aimed at and obtain minute resinous particles (12).

When the minute resinous particles (12) thus obtained were tested for particle diameter by the use of Coulter Counter (produced by Nikka Kisha K.K., aperture 50 $\mu$m), they were found to have a volume average particle diameter (dv) of 5.60 $\mu$m, contain minute particle diameters and coarse particle diameters only sparingly, and have a narrow particle diameter distribution as evinced by the fact that the ratio of the volume average particle diameter to the number average particle diameter (dp), (dv/dp), was 1.26. The resinous particles (12) after the classification were found to have a number average particle diameter of 5.53 $\mu$m and a coefficient of variation of particle diameter of 8.5%. While a complicated operation of classification would be required where a particle diameter distribution was wide, the minute resinous particles only required one simple operation of classification because the particle diameter distribution was narrow.

Then, conductive particles (12) were obtained by subjecting the resinous particles (12) to electroless Ni plating and further to electroless Au plating. When the conductive particles (12) obtained as described above were observed under SEM and XMA, the resinous particles (12) had the surface thereof thoroughly coated with an Ni plate and further with an Au plate. When the cross section of the conductive particles (12) was observed under TEM, the conductive layer was found to have a thickness of 0.4 μm.

An anisotropically conductive film was manufactured by thermally mixing the conductive particles (12) obtained above in a butadiene-styrene block copolymer and forming the resultant mixture. When the anisotropically conductive film was used for connecting the electrode of a liquid crystal display panel to the circuit substrate of a driving LSI, a liquid crystal display panel showing no sign of erroneous operation or display any here on the screen and exhibiting excellent conductivity indicating perfect absence of a defective electric contact.

Control 1

When 6 parts of hydrophobic negatively charging silica (Aerosil R976, produced by Japan Aerosil K.K.) was through into 150 parts of deionized water and they were stirred together at 4000 rpm for 5 minutes by the use of T.K. Homomixer (produced by Tokushu Kiko Kogyo K.K.) by following the procedure of Example 1 while omitting the addition of ethyl alcohol, substantially the whole hydrophobic negatively charging silica remained afloat on the water. When the stirring was further continued at 8000 rpm, an aqueous dispersion having the hydrophobic negatively charging silica uniformly dispersed therein was not obtained.

Liquid drops of a polymerizable monomer composition were formed by following the procedure of Example 1 while an aqueous medium containing the hydrophobic negatively charging silica which had not been fully dispersed in the aqueous medium as mentioned above and they were subjected to suspension polymerization. The stability of dispersion during the course of reaction was inferior and part of the liquid drops of the polymerizable monomer composition yielded to coalition and the formation of aggregate was observed. The polymerization product was stripped of the aggregate with the aid of a 200-mesh metallic gauze and treated by following the procedure of Example 1 to obtain resinous particles (1) for comparison.

When the minute resinous particles (1) for comparison thus obtained were tested for particle diameter by the use of Coulter Counter (produced by Nikka Kisha K.K., aperture 100 μm), they were found to have a volume average particle diameter (dv) of 14.3 μm, contain plenty of minute particle diameters and coarse particle diameters, and have a wide particle diameter distribution as evinced by the fact that the ratio of the volume average particle diameter to the number average particle diameter (dp), (dv/dp), was 1.89.

When the minute resinous particles (1) for comparison were tested for volume specific resistivity by the use of a dielectric loss tester (TR-1100, produced by Ando Denki K.K.) under the conditions of 25° C. of temperature and 1 kHz of frequency, they were found to have a volume specific resistivity of $2.6 \times 10^{10}$ ω·cm.

When the minute resinous particles (1) for comparison were observed under an optical microscope (1000 magnifications), the individual particles were found to be perfectly black spheres showing no sign of maldistribution of carbon black therein.

When the minute resin particles (1) for comparison were subjected to the same evaluation of image by following the procedure of Example 1, the produced images were found to have low density, show a sign of serious fogging and uneven density, and manifest poor resolution invariably under the conditions of normal temperature and normal humidity and under the conditions of high temperature and high humidity.

Control 2

A dispersion of a polymerizable monomer composition was obtained by following the procedure of Example 1 while adding a hydrophobic negatively charging silica to the polymerizable monomer composition instead of uniformly dispersion the hydrophobic negatively charging silica in an aqueous medium with the aid of ethyl alcohol.

Then, by the use of a high shear mixing device, T.K. Homomixer (produced by Tokushu Kika Kogyo K.K.), the dispersion of the polymerizable monomer composition having a hydrophobic negatively charging silica and a pigment uniformly dispersed therein and 450 parts of deionized water added thereto were stirred together at room temperature at 10000 rpm for 10 minutes in an effort to obtain liquid drops of the polymerizable monomer composition (particles of the monomer composition), only in vain.

Control 3

An aqueous dispersion having a hydrophilic negatively charging silica (Aerosil #300, produced by Japan Aerosil K.K.) uniformly dispersed therein was prepared by following the procedure of Example 1 while omitting the use of the hydrophobic negatively charging silica instead. When the aqueous dispersion of the hydrophilic negatively charging silica was observed under an optical microscope (1000 magnifications), the hydrophilic negatively charging silica was found to be finely dispersed uniformly and coarse particles exceeding 1 μm were not detected.

Then, liquid drops of a polymerizable monomer composition were formed by following the procedure of Example 1 while using the aqueous medium having the hydrophilic negatively charging silica uniformly dispersed therein instead and they were subjected to suspension polymerization. The stability of dispersion was found to be inferior during the course of the reaction and the liquid drops of the polymerizable monomer composition yielded to coalition and induced general aggregation.

Control 4

Minute resinous particles (4) for comparison were obtained by following the procedure of Example 1 while using 450 parts of deionized water having 3 parts of polyvinyl alcohol (PVA 205, produced by Kuraray Co., Ltd.) solved in advance therein in the place of the aqueous dispersion having the hydrophobic negatively charging silica uniformly dispersed therein as an aqueous medium containing a dispersion stabilizer.

When the minute resinous particles (4) for comparison thus obtained were tested for particle diameter by the use of Coulter Counter (produced by Nikka Kisha K.K., aperture 100 μm), they were found to have a volume average particle diameter (dv) of 7.8 μm, contain minute particle diameters copiously, and have a wide particle diameter distribution as evinced by the fact that the ratio of the volume average particle diameter to the number average particle diameter (dp), (dv/dp), was 2.35.

When the minute resinous particles (4) for comparison were tested for volume specific resistivity by the use of a dielectric loss tester (TR-1100, produced by Ando Denki K.K.) under the conditions of 25° C. of temperature and 1 kHz of frequency, they were found to have a volume specific resistivity of $1.7 \times 10^{10}$ ω·cm.

When the minute resinous particles (4) for comparison were observed under an optical microscope (1000 magnifications), the individual particles were found to be perfectly black spheres showing no sign of maldistribution of carbon black therein.

When the minute resin particles (4) for comparison were subjected to the same evaluation of image by following the procedure of Example 1, the produced images were found to have low density, show a sign of serious fogging and uneven density, and manifest poor resolution invariably under the conditions of normal temperature and normal humidity and under the conditions of high temperature and high humidity.

Control 5

By the use of T.K. Homomixer (produced by Tokushu Kika Kogyo K.K.), 3 parts of hydrophobic silica (Aerosil R812, produced by Japan Aerosil K.K.) was thrown into 180 parts of deionized water and they were stirred together at 4000 rpm for 5 minutes by following the procedure of Example 4 while omitting the addition of ethyl alcohol. In spite of the stirring, substantially the whole hydrophobic silica remained afloat on the water. When the stirring was further continued at 8000 rpm, an aqueous dispersion having the hydrophobic negatively charging silica uniformly dispersed therein was not obtained.

Liquid drops of a polymerizable monomer composition was formed by following the procedure of Example 4 while using the aqueous medium containing the hydrophobic silica which had not been thoroughly dispersed in the aqueous medium and they were subjected to suspension polymerization. The stability of dispersion was poor during the course of the reaction and the liquid drops of the polymerizable monomer composition yielded to coalition and induced general aggregation.

Control 6

A dispersion of a polymerizable monomer composition having a hydrophobic silica uniformly dispersed therein was prepared by following the procedure of Example 4 while adding the hydrophobic silica to the polymerizable monomer composition instead of uniformly dispersing the hydrophobic silica in an aqueous medium with the aid of ethyl alcohol and stirring the resultant mixture by the use of T.K. Homomixer (produced by Tokushu Kika Kogyo K.K.) at 4000 rpm for 5 minutes.

Then, the manufacture of liquid drops of a polymerizable monomer composition (particles of the monomer composition) was attempted by throwing 530 parts of deionized water into the dispersion of the polymerizable monomer composition having a hydrophobic silica uniformly dispersed therein and stirring them together at room temperature by the use of a high shear mixing device, T.K. Homomixer (produced by Tokushu Kika Kogyo K.K.) at 10000 rpm for 10 minutes, only in vain.

Control 7

By the use of T.K. Homomixer (produced by Tokushu Kika Kogyo K.K.), 8 parts of hydrophobic silica (Aerosil R972, produced by Japan Aerosil K.K.) was thrown into 140 parts of deionized water and they were stirred together at 4000 rpm for 5 minutes by following the procedure of Example 6 while omitting the addition of ethyl alcohol. In spite of the stirring, substantially the whole hydrophobic silica remained afloat on the water. When the stirring was further continued at 8000 rpm, an aqueous dispersion having the hydrophobic negatively charging silica uniformly dispersed therein was not obtained.

Liquid drops of a polymerizable monomer composition were formed by following the procedure of Example 5 while using the aqueous medium containing the hydrophobic silica which had not been thoroughly dispersed in the aqueous medium and they were subjected to suspension polymerization. The stability of dispersion was poor during the course of the reaction and the liquid drops of the polymerizable monomer composition yielded to coalition and induced general aggregation.

Control 8

A dispersion of a polymerizable monomer composition having hydrophobic silica uniformly dispersed therein was prepared by following the procedure of Example 6 while adding the hydrophobic silica to the polymerizable monomer composition instead of uniformly dispersing the hydrophobic silica in an aqueous medium with the aid of ethyl alcohol and stirring the resultant mixture by the use of T.K. Homomixer (produced by Tokushu Kika Kogyo K.K.) at 4000 rpm for 5 minutes.

Then, by the use of a high shear mixing device, T.K. Homomixer (produced by Tokushu Kika Kogyo K.K.), the dispersion of the polymerizable monomer composition having the hydrophobic silica uniformly dispersed therein and 390 parts of deionized water thrown therein were stirred at room temperature at 10000 rpm for 10 minutes in an effort to obtain liquid drops of the polymerizable monomer composition (particles of the monomer composition), only in vain.

The entire disclosure of Japanese patent application Nos. 8-348512 filed on Dec. 26, 1996 and 9-318416 filed on Nov. 19, 1997 including specification, claims, drawings and summary are incorporated herein by reference in its entirety.

What is claimed is:

1. A process for producing resinous particles, comprising dispersing a monomer composition which comprises a polymerizable monomer into a dispersion medium which comprises an inorganic dispersion stabilizer which comprises a hydrophobic inorganic dispersion stabilizer which comprises a hydrophobic inorganic oxide, an aqueous medium and an alcohol selected from the group consisting of methyl alcohol, ethyl alcohol, and isopropyl alcohol, wherein said hydrophobic inorganic oxide is dispersed in said aqueous medium in the presence of said alcohol, and suspension polymerizing said monomer.

2. The process of claim 1, wherein said monomer composition further comprises a coloring agent.

3. The process of claim 1, wherein said hydrophobic inorganic oxide has a hydrophobicity index exceeding 5.

4. The process of claim 3, wherein said hydrophobic inorganic oxide is hydrophobic silica, hydrophobic alumina, hydrophobic titania hydrophobic zirconia, hydrophobic magnesia, hydrophobic zinc oxide, or hydrophobic chromium oxide.

5. The process of claim 3, wherein said hydrophobic inorganic oxide is hydrophobic silica.

6. The process of claim 1, wherein said hydrophobic inorganic oxide has a particle size of 0.001 to 1 μm.

7. The process of claim 1, wherein the amount of said hydrophobic inorganic oxide is 0.1 to 20 parts by weight to 100 parts by weight of said monomer composition.

8. The process of claim 1, wherein the amount of said alcohol is 1 to 3000 parts by weight to 100 parts by weight of said hydrophobic inorganic oxide.

9. The process of claim 1, wherein said polymerizable monomer is a vinyl monomer.

10. The process of claim 1, wherein said polymerizable monomer is styrene or a (meth)acrylic monomer.

11. The process of claim 1, wherein said polymerizable monomer composition further comprises a pigment, dye, magnetic powder, offset preventing agent, charge controlling agent, plasticizer, polymerization stabilizer, antistatic agent, or flame retardant.

12. The process according to claim 1, wherein said resinous particles have a volume average particle diameter of 0.5 to 100 μm.

13. The process claim 1, wherein dispersing the monomer composition into the dispersion medium results in formation of liquid drops having a particle diameter of 0.5 to 100 μm.

* * * * *